(12) United States Patent
Yamamoto et al.

(10) Patent No.: US 11,919,542 B2
(45) Date of Patent: Mar. 5, 2024

(54) MANAGEMENT DEVICE, TRANSPORTATION SYSTEM, AND MANAGEMENT METHOD

(71) Applicant: HONDA MOTOR CO., LTD., Tokyo (JP)

(72) Inventors: Kensaku Yamamoto, Wako (JP); Koichi Ogura, Tokyo (JP); Ryohei Iwaki, Wako (JP); Yurie Kondo, Tokyo (JP); Yusuke Kawada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 447 days.

(21) Appl. No.: 17/202,401

(22) Filed: Mar. 16, 2021

(65) Prior Publication Data

US 2021/0291877 A1 Sep. 23, 2021

(30) Foreign Application Priority Data

Mar. 18, 2020 (JP) ................................ 2020-047379

(51) Int. Cl.
*B60W 60/00* (2020.01)
*B60P 3/00* (2006.01)
(Continued)

(52) U.S. Cl.
CPC ....... *B60W 60/00256* (2020.02); *B60P 3/007* (2013.01); *B60R 25/23* (2013.01);
(Continued)

(58) Field of Classification Search
CPC ......... G05D 1/0088; G05D 2201/0216; G05D 1/0212
See application file for complete search history.

(56) References Cited

U.S. PATENT DOCUMENTS 10,286,853 B1* 5/2019 Carbone ................. G05D 3/10
2012/0323690 A1* 12/2012 Michael ............ G01C 21/3605
705/14.58
(Continued)

FOREIGN PATENT DOCUMENTS

CN 1205822 A * 1/1999 .......... H04M 3/4228
CN 207227977 U * 4/2018
(Continued)

OTHER PUBLICATIONS

Japanese Office Action for Japanese Patent Application No. 2020-047379 dated Nov. 28, 2023.

*Primary Examiner* — Redhwan K Mawari
(74) *Attorney, Agent, or Firm* — Amin, Turocy & Watson, LLP

(57) ABSTRACT

A management device for managing an operation of a cargo transportation vehicle that autonomously travels on a road with no driver and that is able to store cargo in each of a plurality of storages shielded by doors that are opened and closed includes a receiver configured to receive request information about transportation of the cargo from a user, an operation determiner configured to determine the operation of the cargo transportation vehicle so that the cargo transportation vehicle arrives at a delivery destination of the cargo, a registrant configured to register a plurality of users pre-designated as recipients of the cargo, and a processor configured to perform a process of controlling a control mechanism of the storage so that the recipient is able to unload the cargo from the storage when an authentication process on the recipient registered by the registrant has succeeded.

15 Claims, 17 Drawing Sheets

(51) Int. Cl.
 *B60R 25/23* (2013.01)
 *B60R 25/24* (2013.01)
 *B60R 25/30* (2013.01)
 *G05B 15/02* (2006.01)
 *G06F 21/31* (2013.01)

(52) U.S. Cl.
 CPC ............ *B60R 25/24* (2013.01); *B60R 25/305* (2013.01); *G05B 15/02* (2013.01); *G06F 21/31* (2013.01)

(56) References Cited

U.S. PATENT DOCUMENTS

| | | | | |
|---|---|---|---|---|
| 2019/0205819 | A1* | 7/2019 | Igata | .................... G06Q 10/083 |
| 2020/0272990 | A1* | 8/2020 | Dogishi | ........... G06Q 10/08345 |
| 2021/0241224 | A1 | 8/2021 | Taniguchi | |
| 2021/0295245 | A1* | 9/2021 | Ogura | ................. G06Q 10/087 |

FOREIGN PATENT DOCUMENTS

| | | | | |
|---|---|---|---|---|
| CN | 109969735 A | * | 7/2019 | ............. B65G 43/00 |
| JP | 2007-268024 | | 10/2007 | |
| JP | 2018-058656 | | 4/2018 | |
| JP | 2019-070910 | | 5/2019 | |
| JP | 2020-007148 | | 1/2020 | |
| JP | 2018058656 | * | 4/2023 | |
| KR | 20160094619 A | * | 8/2016 | |

* cited by examiner

392

| USER ID | COMMUNICATION IDENTIFICATION INFORMATION | NAME | GENDER | AGE | ADDRESS | OCCUPATION |
|---|---|---|---|---|---|---|
| 0001 | *** | AA | MALE | 9 | ○○ | ○○ |
| 0004 | *** | BB | FEMALE | 35 | ○○ | ○○ |
| ... | ... | ... | ... | ... | ... | ... |

393

| GROUP ID | USER ID |
|---|---|
| GROUP A | 011、012、013 |
| GROUP B | 021、022、023 |
| GROUP C | 031、032、033 |
| ⋮ | ⋮ |

| USER ID | CARGO ID | LOADING POINT | UNLOADING POINT | DESIRED LOADING DATE AND TIME | TYPE OF CARGO | STORAGE DESIGNATION INFORMATION | RECIPIENT ID (USER ID OR GROUP ID) |
|---|---|---|---|---|---|---|---|
| 0001 | A025 | (,) | (,) | 2020/04/30/10:20 | TYPE A | 1-3 | GROUP A |
| 0002 | A134 | (,) | (,) | 2020/05/02/15:00 | TYPE A | 2-2 | 012 |
| 0005 | A002 | (,) | (,) | 2020/05/02/14:30 | TYPE B | 2-1 | GROUP B |
| ... | ... | ... | ... | ... | ... | ... | ... |

| STORAGE DESIGNATION INFORMATION | EVENT (1) | EVENT (2) | EVENT (3) | EVENT (4) | EVENT (5) | ... |
|---|---|---|---|---|---|---|
| 1-1 | ..:.. (HOUR:MINUTE) LOADING CARGO ID:A012 | ..:.. (HOUR:MINUTE) UNLOADING CARGO ID:A012 | — | — | ..:.. (HOUR:MINUTE) LOADING CARGO ID:A658 | ... |
| ... | ... | ... | ... | ... | ... | ... |
| 1-9 | ..:.. (HOUR:MINUTE) LOADING CARGO ID:A264 | — | — | ..:.. (HOUR:MINUTE) UNLOADING CARGO ID:A264 | — | ... |
| 2-1 | EMPTY | — | ..:.. (HOUR:MINUTE) LOADING CARGO ID:A333 | — | — | ... |
| ... | ... | ... | ... | ... | ... | ... |
| 2-9 | ..:.. (HOUR:MINUTE) LOADING CARGO ID:A654 | — | — | — | — | ... |
| POINT | (,) | (,) | (,) | (,) | (,) | ... |
| ROUTE | — | LINK 12, LINK 24, ~ | ~ | ~ | ~ | ... |

GROUP A: EVENT (1), EVENT (2)

GROUP B: EVENT (4), EVENT (5)

МАNAGEMENT DEVICE, TRANSPORTATION SYSTEM, AND MANAGEMENT METHOD

CROSS-REFERENCE TO RELATED APPLICATION

Priority is claimed on Japanese Patent Application No. 2020-047379, filed Mar. 18, 2020, the content of which is incorporated herein by reference.

BACKGROUND

Field of the Invention

The present invention relates to a management device, a transportation system, and a management method.

Description of Related Art

An invention related to an unmanned delivery system for delivering cargo using an autonomous moving device that can move autonomously and a server system that operates in association with the autonomous moving device has been disclosed (Japanese Unexamined Patent Application, First Publication No. 2018-058656).

The above-described conventional technology is for loading cargo into an autonomous moving device in a warehouse and is not sufficiently convenient for users.

SUMMARY

The present invention has been made in view of the above-described circumstances and an objective of the present invention is to provide a management device, a transportation system, and a management method capable of improving convenience.

A management device, a transportation system, a management method, and a storage medium according to the present invention adopt the following configurations.

(1): A management device for managing an operation of a cargo transportation vehicle that autonomously travels on a road in a state in which there is no driver in the cargo transportation vehicle and that is able to store cargo in each of a plurality of storages shielded by doors that are opened and closed, the management device including: a receiver configured to receive request information about transportation of the cargo from a user; an operation determiner configured to determine the operation of the cargo transportation vehicle so that the cargo transportation vehicle arrives at a delivery destination of the cargo; a registrant configured to register a plurality of users pre-designated as recipients of the cargo; and a processor configured to perform a process of controlling a control mechanism of the storage so that the recipient is able to unload the cargo from the storage when an authentication process on the recipient registered by the registrant has succeeded.

(2): In the above-described aspect (1), the request information includes information of a group for receiving the cargo and the registrant registers each of a plurality of preset recipients included in the group as the recipients of the cargo.

(3): In the above-described aspects (1) or (2), the management device further includes an information provider configured to provide recipient information indicating a recipient capable of unloading the cargo from the storage to a terminal device of each of the plurality of users.

(4): In any one of the above-described aspects (1) to (3), the authentication process is a process in which an authenticator provided in the cargo transportation vehicle authenticates the recipient and is a process in which the authenticator authenticates the recipient based on an input password, information transmitted through short-range wireless communication, or an image captured by a camera.

(5): In any one of the above-described aspects (1) to (4), the management device further includes an information provider configured to provide information about unloading of the cargo to a terminal device associated with each of the plurality of users when the cargo has been unloaded from the storage based on an authentication process on a predetermined recipient among the plurality of users.

(6): In any one of the above-described aspects (1) to (5), the receiver receives qualification information indicating that a qualified recipient is set from a terminal device or the request information including the qualification information in accordance with an operation of a predetermined user included in the plurality of users and the registrant sets the recipient who is qualified to be registered based on the qualification information.

(7): In any one of the above-described aspect (6), the management device further includes an information provider configured to transmit an inquiry of whether or not approval for receipt is possible to the terminal device associated with the qualified recipient set in the qualification information when the receiver has received the qualification information, wherein the operation determiner determines the operation of the cargo transportation vehicle so that the cargo transportation vehicle arrives at the delivery destination of the cargo when the receiver has received information indicating the approval for the receipt according to the inquiry.

(8): In any one of the above-described aspect (6) or (7), the receiver receives a change request for changing the delivery destination from a terminal device in accordance with an operation of the predetermined user and the operation determiner determines the operation of the cargo transportation vehicle so that the cargo transportation vehicle arrives at the delivery destination based on the change request received by the receiver.

(9): In any one of the above-described aspects (1) to (8), the management device further includes an information provider configured to provide information about the transportation of the cargo to terminal devices associated with the plurality of users, wherein the receiver receives designation information for designating that the information about the transportation of the cargo is provided to a terminal device of a designated user among the plurality of users, and wherein the information provider provides the information about the transportation of the cargo to the terminal device of the designated user based on the designation information when the receiver has received the designation information.

(10): In any one of the above-described aspects (1) to (9), the management device further includes an information provider configured to provide recipient information indicating a recipient capable of unloading the cargo from the storage to a terminal device included in the plurality of users which is unable to be connected to a predetermined network or in which a predetermined application program is not installed via a voice transmission and reception network different from the predetermined network.

(11): In any one of the above-described aspects (1) to (9), the management device further includes an information provider configured to provide recipient information indicating a recipient capable of unloading the cargo from the storage to a terminal device included in the plurality of users using an automated telephone service.

(12): According to an aspect of the present invention, there is provided a management device for managing an operation of a cargo transportation vehicle that autonomously travels on a road in a state in which there is no driver in the cargo transportation vehicle and that is able to store cargo in each of a plurality of storages shielded by doors that are opened and closed, the management device including: a receiver configured to receive request information about transportation of the cargo from a user; an operation determiner configured to determine the operation of the cargo transportation vehicle so that the cargo transportation vehicle arrives at a delivery destination of the cargo; an information provider configured to provide authority information indicating authority to unload the cargo from the storage to a first terminal device of a first recipient of the cargo that has been pre-designated and provide the authority information to a second terminal device when a request for providing the authority information to the second terminal device of a second recipient of a group to which the first recipient belongs has been received from the first terminal device according to an operation of the first recipient; and a processor configured to perform a process of controlling a control mechanism of the storage so that the cargo is able to be unloaded from the storage based on the authority information.

(13): According to an aspect of the present invention, there is provided a transportation system for managing an operation of a cargo transportation vehicle that autonomously travels on a road in a state in which there is no driver in the cargo transportation vehicle and that is able to store cargo in each of a plurality of storages shielded by doors that are opened and closed, the transportation system including: a receiver configured to receive request information about transportation of the cargo from a user; an operation determiner configured to determine the operation of the cargo transportation vehicle so that the cargo transportation vehicle arrives at a delivery destination of the cargo; a registrant configured to register a plurality of users pre-designated as recipients of the cargo; and a controller configured to control a control mechanism of the storage so that the recipient is able to unload the cargo from the storage when an authentication process on the recipient registered by the registrant has succeeded.

(14): According to an aspect of the present invention, there is provided a management method including: receiving, by a management device, request information about transportation of the cargo from a user, the management device managing an operation of a cargo transportation vehicle that autonomously travels on a road in a state in which there is no driver in the cargo transportation vehicle and that is able to store cargo in each of a plurality of storages shielded by doors that are opened and closed; determining, by the management device, an operation of the cargo transportation vehicle so that the cargo transportation vehicle arrives at a delivery destination of the cargo; registering, by the management device, a plurality of users pre-designated as recipients of the cargo; and performing, by the management device, a process of controlling a control mechanism of the storage so that the recipient is able to unload the cargo from the storage when an authentication process on the registered recipient has succeeded.

(15): According to an aspect of the present invention, there is provided a storage medium storing a program for causing a computer of a management device for managing an operation of a cargo transportation vehicle that autonomously travels on a road in a state in which there is no driver in the cargo transportation vehicle and that is able to store cargo in each of a plurality of storages shielded by doors that are opened and closed, to execute processes of: receiving request information about transportation of the cargo from a user; determining an operation of the cargo transportation vehicle so that the cargo transportation vehicle arrives at a delivery destination of the cargo; registering a plurality of users pre-designated as recipients of the cargo; and controlling a control mechanism of the storage so that the recipient is able to unload the cargo from the storage when an authentication process on the registered recipient has succeeded.

According to the above-described aspects (1) to (15), convenience can be improved.

According to the aspect (5), because the management device provides the information about the unloading of the cargo to the terminal device of each of the plurality of users, the information can be easily shared by the plurality of users.

According to the aspects (6) and (7), because the user can set the qualified recipient of the cargo, anyone other than the qualified person does not know that the cargo has been delivered and the privacy of the user is protected.

According to the aspect (8), because the user can change the delivery destination of the cargo, the user can receive the cargo at a convenient place.

According to the aspect (9), the user can designate a user to which information is provided, so that the manageability of the information is improved.

BRIEF DESCRIPTION OF THE DRAWINGS

FIG. 8 is a diagram showing an example of content of a request information list.

FIG. 9 is a diagram showing an example of content of movement schedule information.

DETAILED DESCRIPTION

Hereinafter, embodiments of a management device, a transportation system, a management method, and a storage medium of the present invention will be described with reference to the drawings. A cargo transportation vehicle, which is managed by the management device, can autonomously travel on a road in a state in which there is no driver in the vehicle and has a cargo storage shielded by a door capable of being opened and closed.

The cargo transportation vehicle recognizes a situation outside the vehicle using a monitoring unit such as a camera, a radar device, and a light detection and ranging (LIDAR) sensor and moves on the road so that obstacles on the road are avoided while the vehicle travels along a route indicated by the management device as a general rule. In the cargo transportation vehicle, for example, wheels are driven by a motor and move on the road at a speed of about 10 [km/h]. A storage unit of the cargo transportation vehicle forms, for example, a space (an available portion) for loading a plurality of cargo items separated from other spaces. A plurality of users can load cargo into the storage unit and a designated user can unload the cargo from the storage.

The management device manages (controls) an operation of the cargo transportation vehicle. The management device may be a device placed in a place different from that of the cargo transportation vehicle and may communicate with the cargo transportation vehicle via a network or some or all functions of the management device may be provided in the cargo transportation vehicle. The management device generates transportation schedule information, for example, on the basis of request information acquired from a terminal device of a user through communication. The management device issues an instruction to the cargo transportation vehicle with respect to a route and a stop position of the cargo transportation vehicle, an open/closed state of the door of the storage, and the like on the basis of the transportation schedule information.

In the following description, the management device is a device placed in a place different from the cargo transportation vehicle (for example, a device having a form of a cloud server) and is configured to implement the above-described functions by communicating with the terminal device of the user or the cargo transportation vehicle via the network.

First Embodiment

[Overall Configuration]

Figure 1:
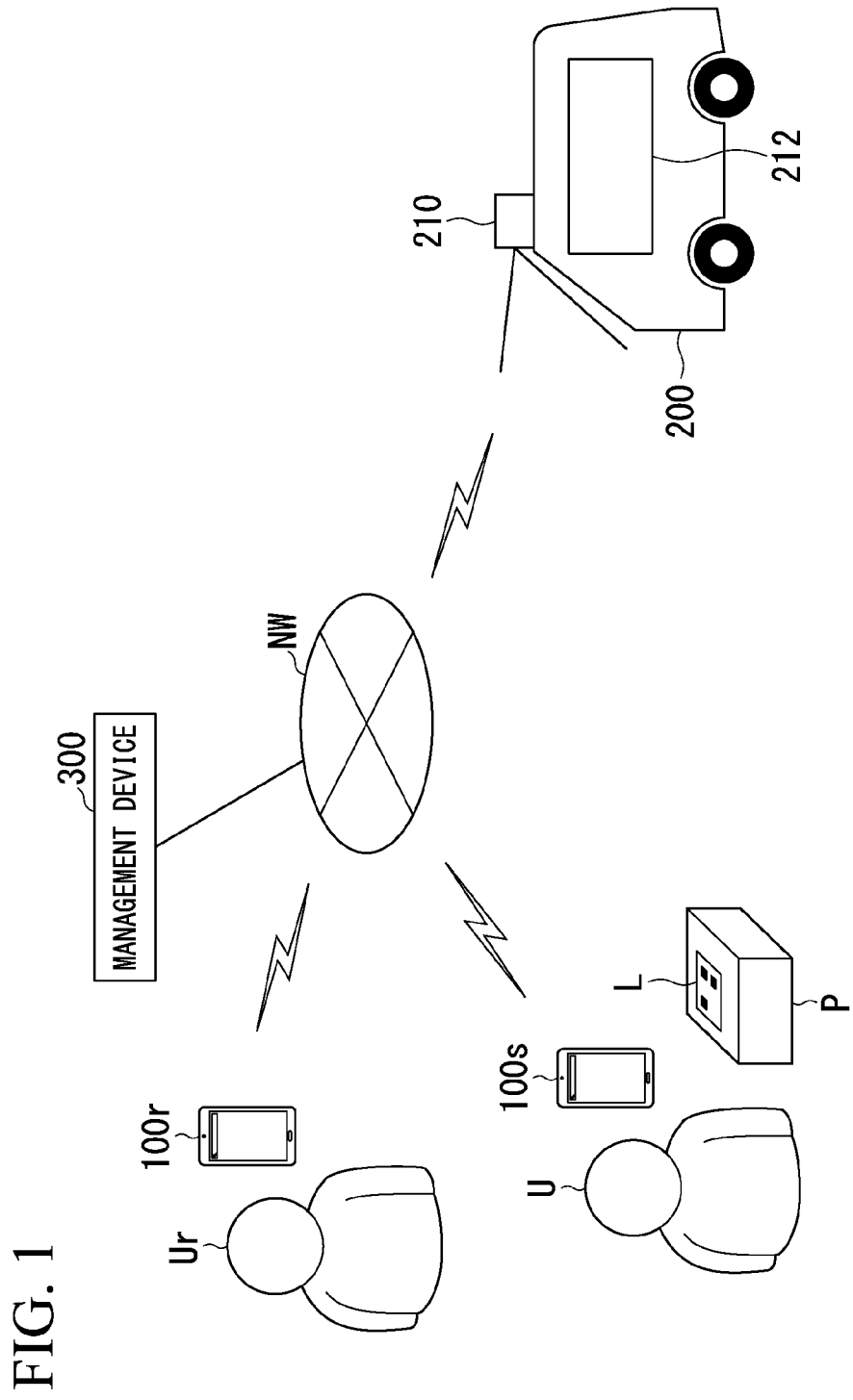
FIG. 1 is a configuration diagram of a transportation system including a management device.

FIG. 1 is a configuration diagram of a transportation system 1 including a management device 300. The transportation system 1 includes one or more cargo transportation vehicles 200 and a management device 300. The management device 300 communicates with a terminal device 100s used by a user U and a terminal device 100r used by a user Ur via a network NW. The network NW includes the Internet, a wide area network (WAN), a local area network (LAN), a public circuit, a provider device, a dedicated circuit, a radio base station and the like. The management device 300 communicates with the cargo transportation vehicle 200 via the network NW. The "terminal device used by the user" is a terminal device, which can be used by an unspecified number of people, such as a terminal device of an Internet cafe, and may include a terminal device that is temporarily used by the user. In any case, the "terminal device of the user" refers to a terminal device in which the user who is performing an operation is identified according to, for example, a login operation of inputting a login name. The user U is a requester who has requested the delivery of cargo and the user Ur is a recipient of cargo and may be hereinafter referred to as a "recipient." The user U may be a recipient and the user Ur may be a requester who requests the delivery of the cargo. Hereinafter, when the terminal device 100s and the terminal device 100r are not distinguished, they may be referred to as terminal devices 100. When the user U and the user Ur are not distinguished, they may be simply referred to as users.

The user U transmits request information for requesting the transportation of cargo P to the management device 300 using the terminal device 100. A label L to which identification information of the cargo P and/or the user U is written or which is stored in a built-in IC tag or the like is given to the cargo P. "Given" means, for example, that the label L is attached by a sticker.

The terminal device 100 is, for example, a smartphone, a tablet terminal, a personal computer, or the like. In the terminal device 100, an application program for using the above-described service, a browser, or the like is activated to support services to be described below. In the following description, it is assumed that the terminal device 100 is a smartphone and an application program (a transportation service application) for receiving the service is activated. The transportation service application communicates with the management device 300 in accordance with an operation of the user and transmits request information from the user to the management device 300 or provides information based on the information received from the management device 300. The request information is electronic information for requesting the cargo transportation vehicle 200 to transport the cargo P across a designated section.

[Cargo Transportation Vehicle]

The cargo transportation vehicle 200 includes a monitoring unit 210 such as a camera, a radar device, or a LIDAR sensor and autonomously travels on the road as described above. A display device 212 may be provided in the cargo transportation vehicle 200. The display device 212 may have a function of a touch panel or may have a function of communicating with a non-contact type IC card embedded therein.

Figure 2:
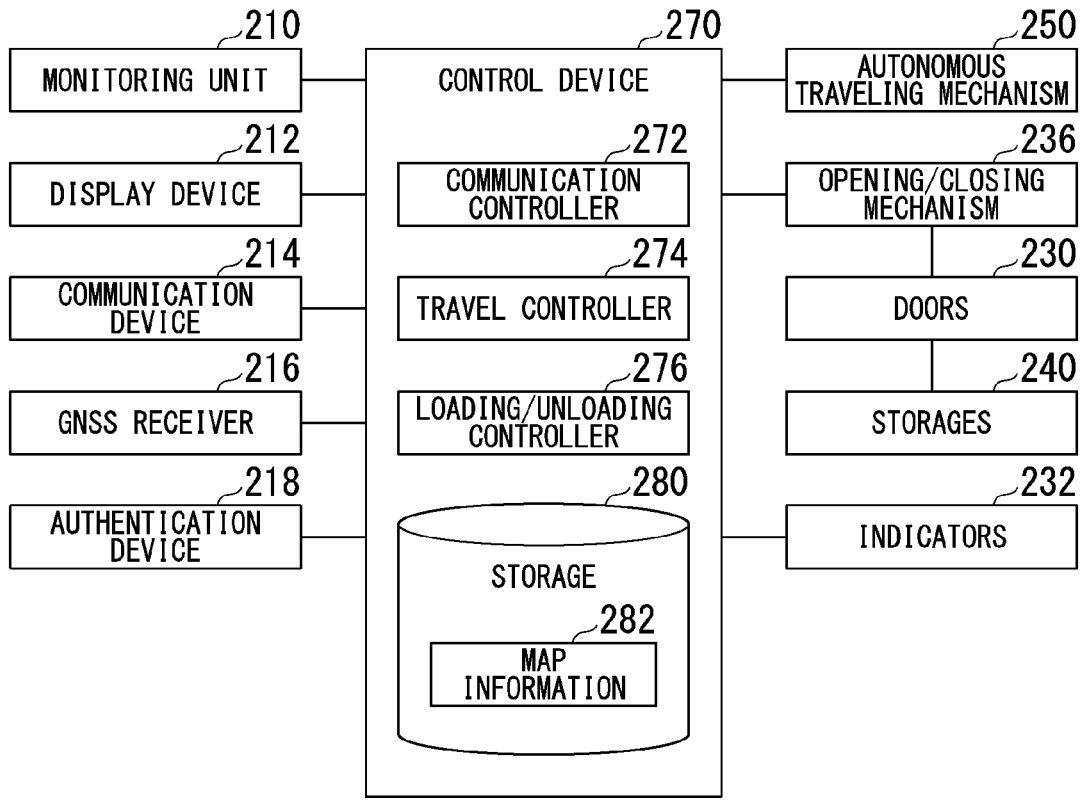
FIG. 2 is a configuration diagram of a cargo transportation vehicle.

FIG. 2 is a configuration diagram of the cargo transportation vehicle 200. In addition to the above-described monitoring unit 210 and the above-described display device 212, the cargo transportation vehicle 200 includes a communication device 214, a global navigation satellite system (GNSS) receiver 216, an authentication device 218, a stop button 220, an opening/closing mechanism 236, an autonomous traveling mechanism 250, and a control device 270.

The communication device 214 is, for example, a wireless communication module for connecting to the network NW or directly communicating with another vehicle, a terminal device of a pedestrian, or the like. The communication device 214 performs wireless communication on the basis of Wi-Fi, dedicated short range communications (DSRC), Bluetooth (registered trademark), and other communication standards. As the communication device 214, a plurality of communication devices according to purpose of use may be provided.

The GNSS receiver 216 measures a position of its own device (a position of the cargo transportation vehicle 200) on the basis of radio waves received from a GNSS satellite (for example, a GPS satellite). The GNSS receiver 216 outputs a position measurement result to the control device 270.

The authentication device 218 is a device for confirming that a user who intends to load the cargo P into the cargo transportation vehicle 200 or a user who intends to unload the cargo P is an authorized user (or a device for authenticating the user). The authorized user is a user who has made an agreement (reservation) regarding the transportation of cargo with the management device 300. The authentication device 218 may be any device having an authentication function such as a short-range wireless communication device, a biometric authentication device, or a password input device. The authentication device 218 outputs an authentication result to the control device 270. For example, the user is authenticated by performing the collation of a password entered by the user or the collation of information transmitted through short-range wireless communication.

The authentication device 218 may include a camera that images the user and may analyze an image captured by the camera and authenticate the user on the basis of an analysis result. For example, when a first feature of an analysis result of an image stored in the storage device matches a feature of the analysis result of the captured image, the authentication device 218 determines that the user corresponding to the captured image is a user associated with the first feature. The analysis result of the image stored in the storage device is a result of analyzing the image pre-registered by the user.

The opening/closing mechanism 236 is provided for each door 230 and includes a motor, an arm, and the like. The opening/closing mechanism 236 causes the door 230 to be individually opened and closed. For example, a switch for detecting that the door 230 has been manually closed is attached to the door 230. A locking mechanism may be provided in place of (or in addition to) the opening/closing mechanism 236. In this case, when the door of the storage 240 used by the user U is unlocked, an indicator 232 (to be described below) is turned on and the user U manually opens and closes the door 230.

Figure 3:
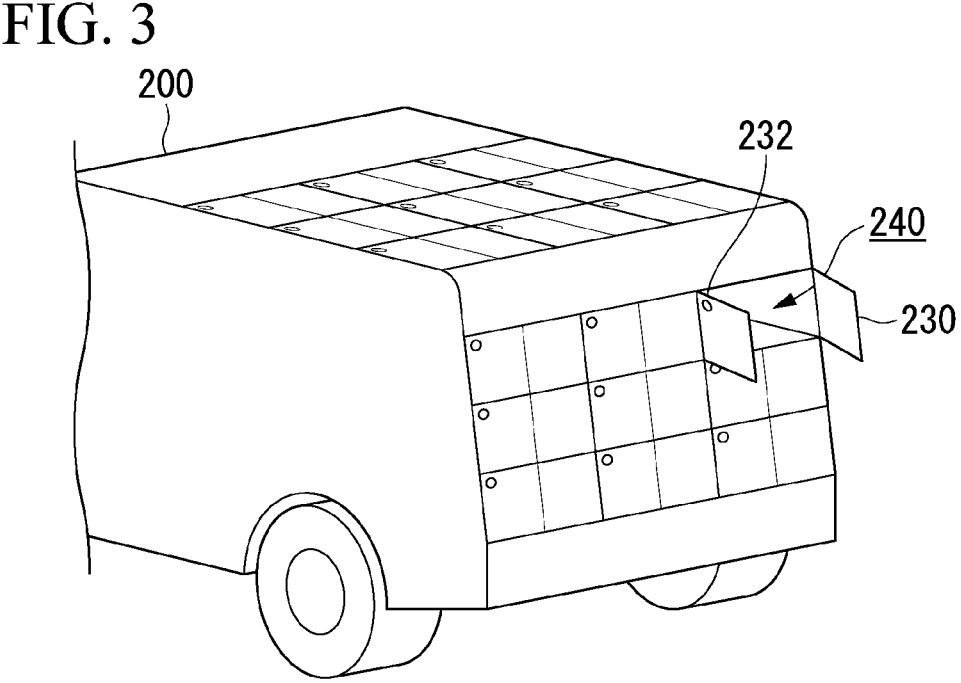
FIG. 3 is a diagram showing an example of a structure related to a plurality of storages.

FIG. 3 is a diagram showing an example of a structure related to a plurality of storages 240. The cargo transportation vehicle 200 includes the plurality of storages 240. In the configuration shown in FIG. 3, the cargo transportation vehicle 200 includes nine storages 240 that are open on an upper surface side of the cargo transportation vehicle 200 and nine storages 240 that are open on a rear surface side thereof. A door 230 is provided in each of the storages 240. The door 230 is opened and closed, for example, in the form of a hinged double door and at least a part of the storage 240 is exposed when the door 230 is in the open state. The indicator 232 is attached in correspondence with each storage 240 (for example, on the surface side of each door 230). The indicator 232 includes, for example, a light emitting diode (LED). The indicator 232 is allowed to emit light by the loading/unloading controller 276 so that a loading position of the cargo P to be loaded or a position where the cargo P to be unloaded is stored is indicated. An agreement is established so that each storage 240 stores one item of cargo P or cargo P of one user U. For example, at a cargo collection center, it is possible to recognize whose cargo the cargo P stored in the storage 240 is on the basis of which storage 240 the cargo P is stored in. For example, when a label is given to the cargo P by a worker at the cargo collection center, a delivery destination (an unloading point) can be identified in the subsequent work.

The autonomous traveling mechanism 250 includes wheels, a driving force source such as a motor, an energy storage means such as a battery, a steering mechanism, and the like. The autonomous traveling mechanism 250 causes the cargo transportation vehicle 200 to move in any direction in accordance with an instruction of the control device 270.

The control device 270 includes, for example, a communication controller 272, a travel controller 274, and a loading/unloading controller 276. These components are implemented by, for example, a hardware processor such as a central processing unit (CPU) executing the program (software). Some or all of these components may be implemented, for example, by hardware (a circuit including circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as a hard disk drive (HDD) or a flash memory or may be stored in a removable storage medium (a non-transitory storage medium) such as a DVD or a CD-ROM and installed in the storage device when the storage medium is mounted in a drive device. The control device 270 has a storage 280 that stores map information 282. The storage 280 is an HDD, a flash memory, a ROM, a random access memory (RAM), or the like.

The communication controller 272 acquires route information from the management device 300 via the communication device 214 and outputs the route information to the travel controller 274. The communication controller 272 uploads position information indicating the position measured by the GNSS receiver 216 to the management device 300 using the communication device 214. The position information is uploaded periodically, for example, in units of milliseconds to seconds.

The travel controller 274 controls the autonomous traveling mechanism 250 so that the cargo transportation vehicle 200 travels along a route designated by the management device 300. For example, the travel controller 274 causes the route acquired from the management device 300 to match the map information 282 and an output of the monitoring unit 210 and determines a detailed route along which the cargo transportation vehicle 200 is to travel. The travel controller 274 sets traveling along the route as a general rule and causes the cargo transportation vehicle 200 to autonomously travel so that contact with a physical object (including a guardrail, a curb, or the like) whose position or speed has been input from the monitoring unit 210 is avoided.

The travel controller 274 causes the cargo transportation vehicle 200 to stop when a stop instruction has been acquired from the management device 300. Instead of this, when the route information includes information about a stop position, the travel controller 274 may cause the cargo transportation vehicle 200 to stop when the position measurement result of the GNSS receiver 216 has matched the stop position. That is, the management device 300 gives the stop instruction or the information about the stop position to the travel controller 274 and the travel controller 274 causes the cargo transportation vehicle 200 to stop in accordance with the stop instruction and the information. A position where the cargo transportation vehicle 200 is stopped includes a position on a road or in a parking lot and a position designated by the user who can stop the vehicle. In particular, when the user U loads the cargo P into the storage 240 of the cargo transportation vehicle 200 or when a recipient designated by the user U unloads the cargo P of the storage 240, the cargo transportation vehicle 200 is stopped on a road or in a parking lot, a designated place, or the like.

For example, the loading/unloading controller 276 drives the indicator 232 or the opening/closing mechanism 236 at a timing indicated by the management device 300 or a predetermined timing. The loading/unloading controller 276 is an example of a "processor for performing a process of controlling a control mechanism of the storage so that the recipient can unload the cargo from the storage when an authentication process on the recipient registered by the registrant has succeeded." The loading/unloading controller is an example of a "controller."

[Management Device]

Figures 4, 5:
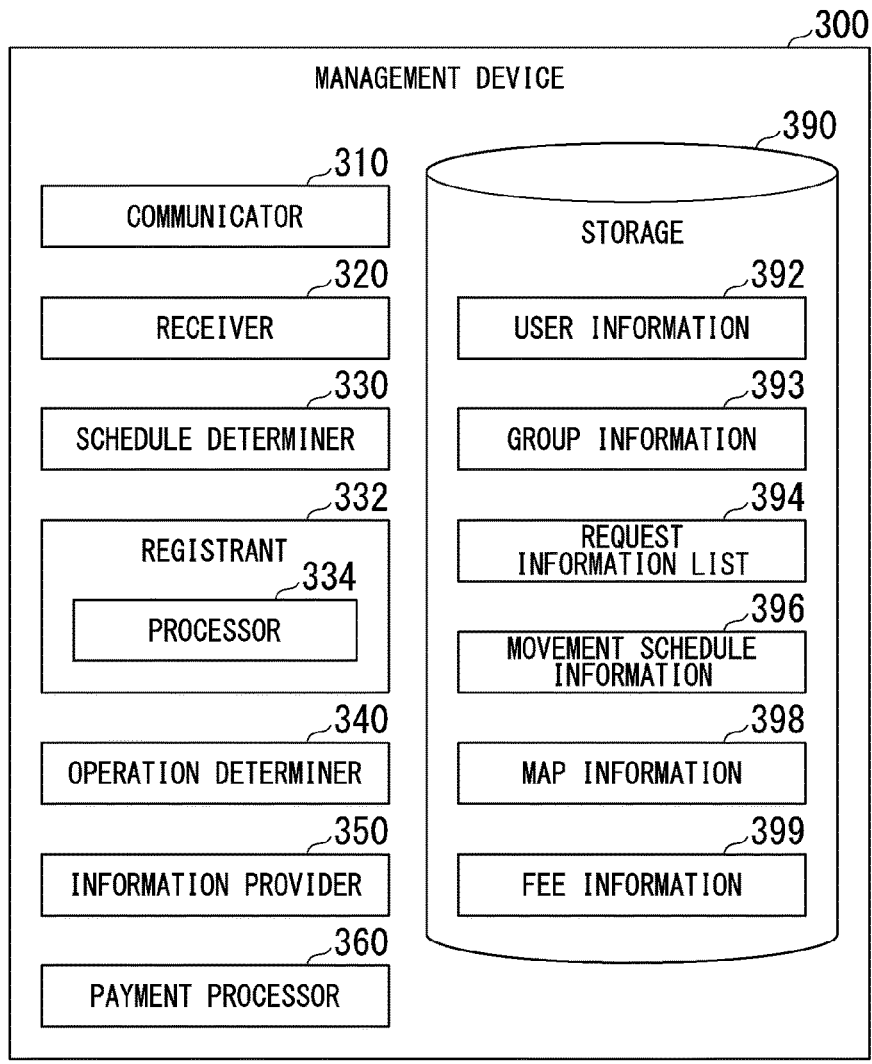
FIG. 4 is a configuration diagram of a management device.
FIG. 5 is a diagram showing an example of content of user information.

FIG. 4 is a configuration diagram of the management device 300. The management device 300 includes, for example, a communicator 310, a receiver 320, a schedule determiner 330, a registrant 332, an operation determiner 340, an information provider 350, and a payment processor 360. These components are implemented by, for example, a hardware processor such as a CPU executing the program (software). Some or all of these components may be implemented, for example, by hardware (a circuit including circuitry) such as an LSI circuit, an ASIC, an FPGA, or a GPU or may be implemented by software and hardware in cooperation. The program may be pre-stored in a storage device (a storage device including a non-transitory storage medium) such as an HDD or a flash memory or may be stored in a removable storage medium (a non-transitory storage medium) such as a DVD or a CD-ROM and installed in the storage device when the storage medium is mounted in a drive device. The management device 300 may include a storage 390. The storage 390 is implemented by a DVD, a RAM, a flash memory, or the like. Information such as user information 392, group information 393, a request information list 394, movement schedule information 396, map information 398, and fee information 399 (to be described below) is stored in the storage 390.

FIG. 5 is a diagram showing an example of content of the user information 392. For example, in the user information 392, information such as communication identification information, a name, a gender, age, an address, and an occupation is associated with a user ID which is identification information of the user. Each item of the user information 392 is registered in advance when the user joins a service managed by the management device 300. The communication identification information is information necessary for transmitting information to the terminal device 100 and is information such as an application ID, an Internet protocol (IP) address, a media access control (MAC) address, a mail address, and the like given to an application program. The terminal device 100 having the communication identification information associated with the user ID is a terminal device associated with the user.

Figures 6, 7:
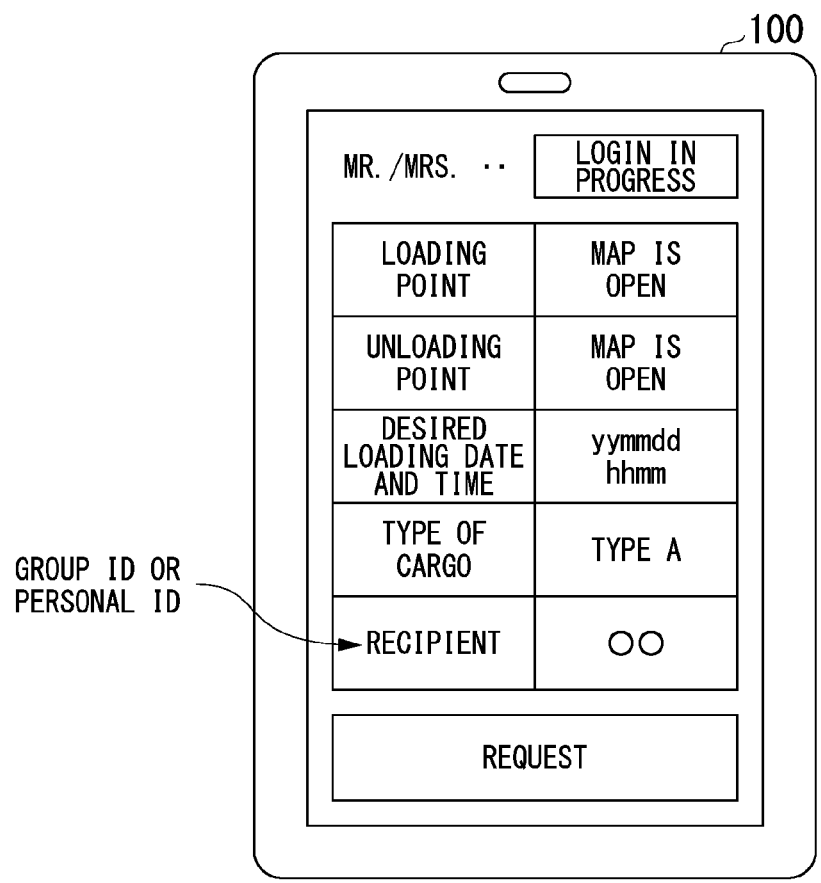
FIG. 6 is a diagram showing an example of content of group information.
FIG. 7 is a diagram showing an example of a transportation service application screen for inputting request information displayed on a display of a terminal device.

FIG. 6 is a diagram showing an example of content of the group information 393. In the group information 393, for example, a user ID included in a group is associated with a group ID which is identification information of the group. The group defined in the group information 393 is a group defined by the user. For example, when a user operates the terminal device 100 to designate another user to be included in the group, a notification of an inquiry of whether or not approval for the inclusion in the group is possible is provided to the terminal device 100 of the designated user. When the user operates the terminal device 100 and approves the inclusion in the group, the user is included in the group. Thereby, the user is registered in the group of the group information 393.

The communicator 310 is, for example, a network card for connecting to a network NW. The communicator 310 communicates with the terminal device 100 or the cargo transportation vehicle 200 via the network NW.

The receiver 320 acquires (receives) request information issued from the terminal device 100 of the user via the communicator 310 and adds the request information to the request information list 394. FIG. 6 is a diagram showing an example of a transportation service application screen for inputting request information displayed on the display of the terminal device 100. As shown in FIG. 6, a loading point (first designation information), an unloading point (second designation information), a desired loading time, a type of cargo indicating a size or a shape of the cargo, identification information of a recipient (a user) who receives the cargo, and the like can be input on the transportation service application screen and the information input by the user U is transmitted as the request information to the management device 300. The loading point or the unloading point is input by, for example, the terminal device 100 displaying a map and the user U designating a point on the map. It is only necessary for the number of recipients to be one or more. The number of recipients may be one or two or more. This will be described below. After the request information is received, the recipient may operate the terminal device 100r to designate an unloading point.

FIG. 8 is a diagram showing an example of content of the request information list 394. The request information list 394 is, for example, information in which a user ID of a user who has transmitted request information, a cargo ID which is identification information of cargo, a loading point which is a start point of a section related to the transportation of the cargo, an unloading point which is an end point of the section, a desired loading time, a type of cargo, storage designation information, recipient identification information (a recipient ID), and the like are mutually associated. The recipient ID may be a user ID of a user who is a recipient or may be a group ID of a group to be described below.

A set of a user ID, a cargo ID, a loading point, an unloading point, a desired loading time, a type of cargo, and a recipient ID related to one request information element is referred to as a record. The cargo ID is given by the receiver 320. The request information is any format of information including content required to generate a record. The storage designation information is information indicating which storage 240 is assigned. In FIG. 7, "1" of "1-3" indicates the upper surface side of the cargo transportation vehicle 200 and "-3" indicates one of the nine storages on the upper surface side. "2" of "2-2" indicates the rear surface side of the cargo transportation vehicle 200 and "-2" indicates one of the nine storages on the rear surface side.

The storage designation information is determined by, for example, the schedule determiner 330. When the storage designation information is determined in correspondence with the request information received from the user U, the schedule determiner 330 transmits determination content to the terminal device 100 of the user. The terminal device 100 displays information indicating the determination content. Thereby, the user U can recognize in advance a position of the storage 240 where the cargo P is required to be stored. This storage designation information is also transmitted to the terminal device 100 associated with a recipient ID. The recipient of the recipient ID can take out the cargo from the storage 240 with reference to the storage designation information. For example, the recipient performs authentication by inputting a password provided by the management device 300 to the authentication device 218 or transmitting the recipient ID from the terminal device 100 to the authentication device 218. After the authentication is completed, the loading/unloading controller 276 causes the opening/closing mechanism 236 to be driven and causes the door 230 designated in the storage designation information to be open. Thereby, the recipient can unload the cargo. When the cargo is unloaded and the recipient closes the door, the cargo transportation vehicle 200 determines that the cargo has been taken out and starts traveling toward the next destination. The presence or absence of cargo may be determined on the basis of a detection result of a weight measuring sensor attached to the storage 240.

When a new request information record is added to the request information list 394, the schedule determiner 330 refers to a list of cargo transportation vehicles 200 (not shown) and the movement schedule information 396 and selects a cargo transportation vehicle 200 to be used for the user U related to the request information from among a plurality of cargo transportation vehicles 200. For example, the schedule determiner 330 determines whether or not it is appropriate to incorporate the collection of cargo P in the existing movement schedule of the cargo transportation vehicle 200 already incorporated in the movement schedule information 396 after the number of cargo transportation vehicles 200 capable of transporting the cargo P is narrowed down with reference to a type of cargo included in the request information, adds the collection of the cargo P to the existing movement schedule if it is appropriate, and registers the collection of the cargo P by setting a movement schedule of a new cargo transportation vehicle 200 otherwise. The storage designation information is determined as described above and is transmitted to the terminal device 100 of the user U.

FIG. 9 is a diagram showing an example of content of the movement schedule information 396. In the movement schedule information 396, a daily schedule is set as one unit with respect to each of the cargo transportation vehicles 200. In the movement schedule information 396, an estimated time, information indicating loading or unloading, a cargo ID of cargo P to be transported, a point where loading or unloading is performed, information of a route between points (for example, a route from a previous event to a current event), and the like are associated with an event in which loading or unloading is performed (hereinafter, the event may be referred to as a loading event or a unloading event) with respect to each of the storages 240. The route is represented by, for example, a sequential arrangement of links in the map information 398. For example, after records of request information are roughly grouped according to each of a date, a time period, and a region, the schedule determiner 330 sets some movement patterns in which a plurality of loading points and a plurality of desired loading times are sequentially arranged, extracts a movement pattern whose movement cost is lowest with reference to the map information 398, and adds the extracted movement pattern to the movement schedule information 396. As for a movement cost calculation technique or a movement cost evaluation technique, various techniques are known in the field of the navigation system and thus description thereof will be omitted.

The registrant 332 registers a plurality of pre-designated users as recipients of the cargo. The registrant 332 registers the users included in the group as the recipients of the cargo with reference to the group information 393. For example, in the example of FIG. 9, the registrant 332 registers one or more users as the recipients of the cargo with respect to the unloading event. For example, as shown in FIG. 9, the registrant 332 registers that the user included in the group A is the recipient with respect to the event (2) and registers that the user included in the group B is the recipient with respect to the event (4).

The registrant 332 includes a processor 334. The processor 334 performs a process of controlling the control mechanism of the storage 240 so that the recipient can unload the cargo from the storage 240 of the cargo transportation vehicle 200 when the authentication process on the recipient registered by the registrant 332 has succeeded. The above-described process is, for example, a process in which the processor 334 transmits information used for the authentication process of the authentication device 218 of the cargo transportation vehicle 200 to the cargo transportation vehicle 200. The information used for the authentication process includes a passcode, a password, and feature information obtained from an analysis result of an image in which the recipient is imaged. For example, the processor 334 transmits the passcode provided to the recipient registered by the registrant 332 to the cargo transportation vehicle 200. When the passcode is input to the authentication device 218 and the authentication device 218 has successfully performed the authentication process on the basis of the passcode, the loading/unloading controller 276 of the cargo transportation vehicle 200 controls the opening/closing mechanism 236 of the storage 240 and the recipient is allowed to take out the cargo from the storage 240.

The operation determiner 340 transmits an operation instruction to the cargo transportation vehicle 200 using the communicator 310 on the basis of the movement schedule information 396 as described above. That is, the operation determiner 340 determines the operation of the cargo transportation vehicle 200 on the basis of the movement schedule information 396 generated on the basis of the request information received by the receiver 320. The operation of the cargo transportation vehicle 200 determined by the operation determiner 340 includes content indicating a stop instruction (which may indicate a stop timing or may be left to the determination of the cargo transportation vehicle 200 in a state in which a point is indicated) at the route, the loading point or the unloading point, content indicating which storage 240 is in an empty state at the loading point or the unloading point, and the like.

As shown in FIG. 8, in relation to the storage 240 whose storage designation information is "1-1," the movement schedule information 396 is set so that cargo P whose cargo ID is "A012" is loaded in an event (1) and unloaded after the transportation in an event (2) and then cargo P whose cargo ID is "A658" is loaded in an event (5). In relation to the storage 240 whose storage designation information is "2-1," while the cargo P is delivered in another storage 240, cargo P whose cargo ID is "A333" is loaded in an event (3). According to this, the operation determiner 340 causes the cargo transportation vehicle 200 by which the cargo P is being delivered to collect new cargo P. The operation determiner 340 issues an instruction to the opening/closing mechanism 236, which is a driver of the door 230, so that the new cargo P which is collected is loaded into the storage 240 in an empty state according to the delivery of the cargo transportation vehicle 200 by which the cargo P is being delivered. As a result, convenience can be improved.

The information provider 350 provides position information or route information of the cargo transportation vehicle 200 to the terminal device 100 of the user (the terminal device 100 of the user U who is the requester or the recipient). The information provider 350 transmits the position information uploaded using the communication device 214 according to the communication controller 272 of the cargo transportation vehicle 200 or the route information described in the movement schedule information 396 to the terminal device 100 using the communicator 310. For example, the information provider 350 transmits information for displaying an image showing position information or route information superimposed on a map image to the terminal device 100.

The payment processor 360 performs a process of collecting a fee from the user U or the recipient. For example, the payment processor 360 cooperates with a credit card or electronic money management server to collect a fee from the user U or the recipient.

[Sequence]

Figure 10:
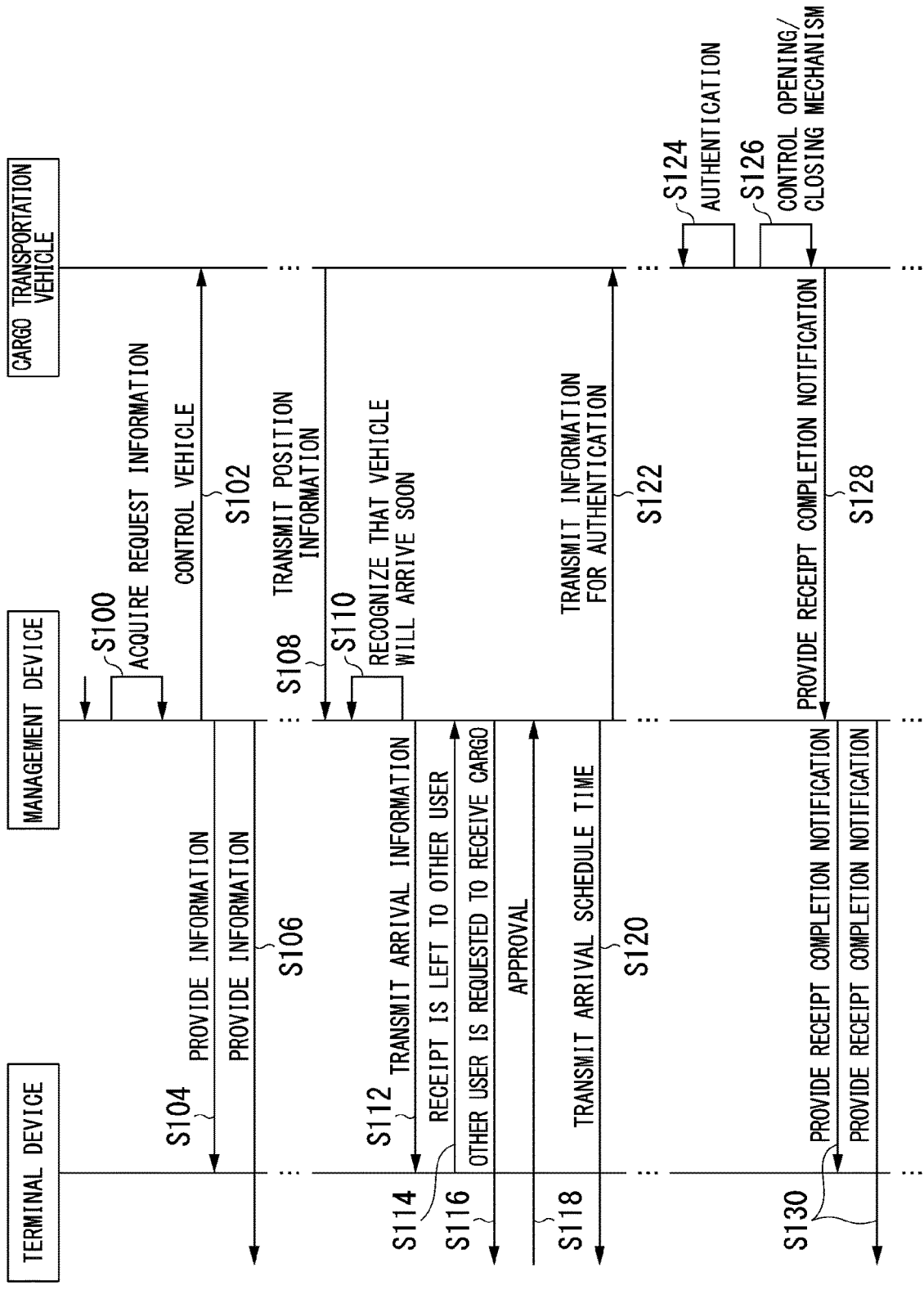
FIG. 10 is a sequence diagram showing an example of a flow of a process executed by a terminal device, a cargo transportation vehicle, and a management device.

FIG. 10 is a sequence diagram showing an example of a flow of a process executed by the terminal device 100, the cargo transportation vehicle 200, and the management device 300. This is an example of a process in which the cargo P is transported toward a predetermined delivery point (an unloading point or a delivery destination) on the basis of the movement schedule information 396 and the user receives the cargo P at the delivery point.

When the terminal device 100 of a predetermined user transmits request information, the management device 300 acquires the request information (step S100), generates movement schedule information 396, transmits a route based on the generated movement schedule information to the cargo transportation vehicle 200, and controls the cargo transportation vehicle 200 (step S102). At this time, the management device 300 also transmits a cargo movement schedule and information for use in authentication (an example of recipient information) to the terminal device 100 (steps S104 and S106). For example, in the process of the present sequence, it is assumed that a predetermined group is set as the recipient. Thus, the management device 300 transmits various types of information to the terminal device 100 of the recipient included in the group. In this way, the management device 300 provides the terminal device 100 of each of the plurality of users with recipient information indicating the recipient capable of unloading the cargo from the storage 240.

Next, the management device 300 acquires position information transmitted by the cargo transportation vehicle 200 (step S108) and recognizes a position of the cargo transportation vehicle 200 on the basis of the acquired position information. Step S108 and a process of recognizing the position of the cargo transportation vehicle 200 are executed at predetermined intervals.

When it is recognized that the cargo transportation vehicle 200 has arrived near the delivery point (it is recognized that it is several minutes to several tens of minutes before the cargo transportation vehicle 200 arrives at the delivery point) (step S110), the management device 300 notifies the terminal device 100 of information indicating that the cargo transportation vehicle 200 will arrive soon (step S112). In the present process, this notification is transmitted to a predetermined recipient (a representative recipient or a recipient included in a group) among the recipients included in the group. The above-described notification includes an inquiry of whether the representative recipient will receive the cargo.

The terminal device 100 of the representative recipient transmits information indicating approval or disapproval for the receipt to the management device 300 on the basis of the operation of the representative recipient (step S114). When the representative recipient receives the cargo, the representative recipient receives the cargo by performing the process to be described below.

When the representative recipient has transmitted information indicating that he or she has not approved to receive the cargo to the management device 300, the management device 300 provides a notification of information about a request to the terminal device 100 of another recipient so that the other recipient included in the group is requested to receive the cargo (step S116). For example, all recipients other than the representative recipient in the group are notified of the request. The other recipients described above may be recipients designated by the representative recipient or may be pre-designated recipients.

When another recipient transmits information indicating that he or she has accepted a cargo receipt request to the management device 300 (step S118), the management device 300 transmits an estimated arrival time of the cargo transportation vehicle 200 to the terminal device 100 of the recipient who has accepted the request (step S120). Next, the management device 300 transmits information for authentication (for example, a passcode) to the cargo transportation vehicle 200 (step S122).

Next, when the cargo transportation vehicle 200 arrives at the delivery point, for example, the recipient who has accepted the request inputs the passcode to the authentication device 218 and the authentication device 218 determines that the authentication has succeeded (step S124), the loading/unloading controller 276 controls the opening/closing mechanism 236 so that the recipient can take out the cargo from the storage 240 (step S126). Thereby, the recipient can receive the cargo.

The cargo transportation vehicle 200 estimates that the cargo has been taken out after the door 230 of the storage 240 is opened and the door 230 is closed and notifies the management device 300 that the delivery has been completed (step S128). When this notification is received, the management device 300 transmits information indicating the completion of the delivery to the terminal device 100 of the user included in the group (step S130). When the cargo has been unloaded from the storage 240 on the basis of the authentication process on a predetermined recipient among a plurality of users, the information provider 350 of the management device 300 provides information about the unloading of the cargo to the terminal device 100 associated with each of the plurality of users.

Figure 11:
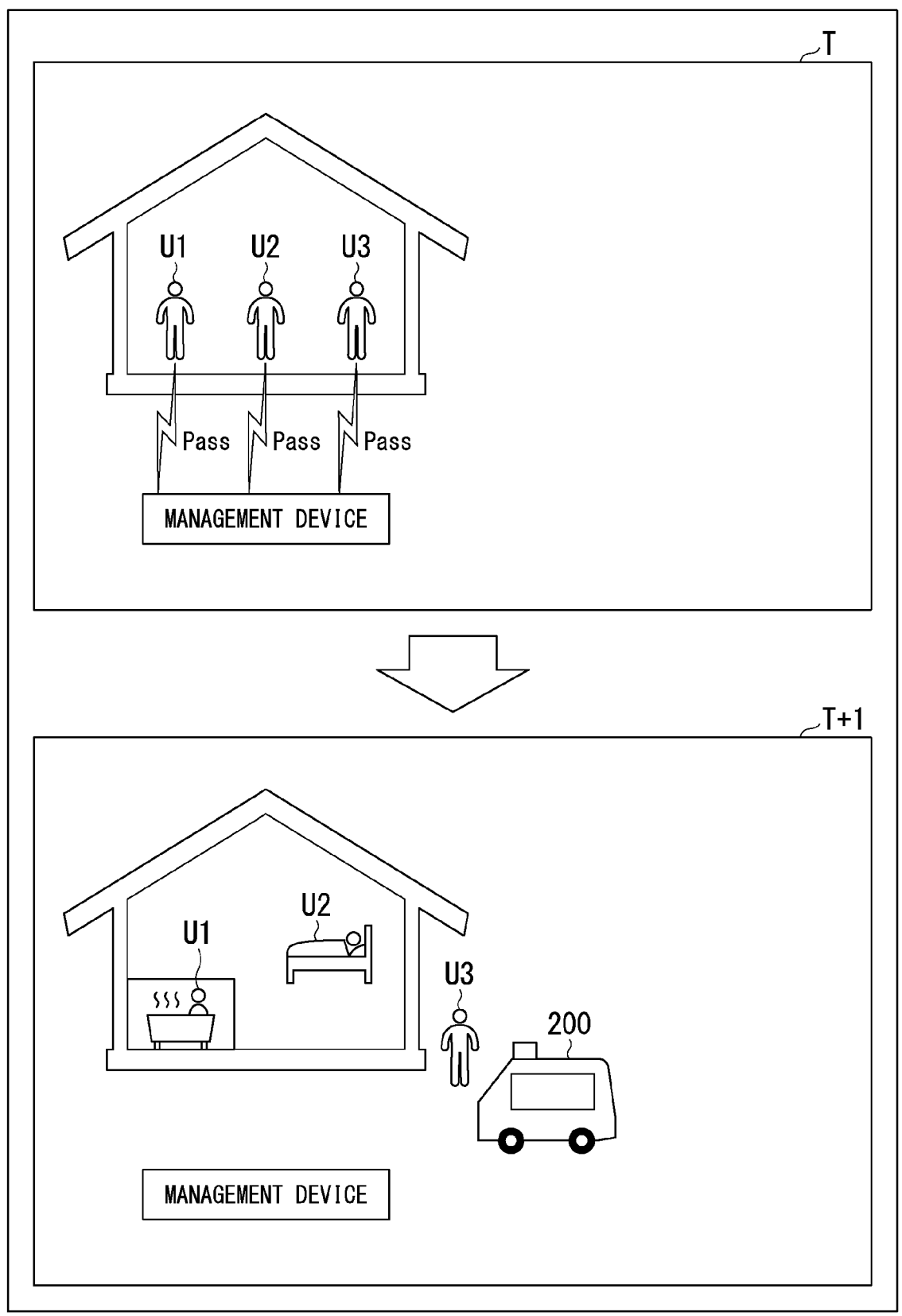
FIG. 11 is a diagram for describing a process (part 1) when cargo is delivered.

FIG. 11 is a diagram for describing a process (part 1) when cargo is delivered. At time T after the delivery of cargo is requested, the recipient included in the group is notified of a passcode. At the time T+1 when the cargo transportation vehicle 200 has arrived at the delivery point, recipients U1 and U2 cannot receive the cargo because the recipient U1 is in a bath and the recipient U2 is sleeping. However, because a recipient U3 can receive the cargo at the time T+1, the recipient U3 can take out the cargo from the storage 240 to receive the cargo.

As described above, even if the original cargo recipient (for example, U1) cannot receive the cargo, another recipient (for example, U3) included in the group can receive the cargo and therefore the convenience of the user is improved. Because an operator does not have to redeliver the cargo, the convenience of the operator is also improved.

[Process of Setting Qualified Recipient]

The management device 300 receives qualification information indicating that a qualified recipient is set or request information including the qualification information from the terminal device in accordance with an operation of a predetermined user included in the plurality of users and sets the qualified recipient to be registered on the basis of the qualification information.

Figure 12:
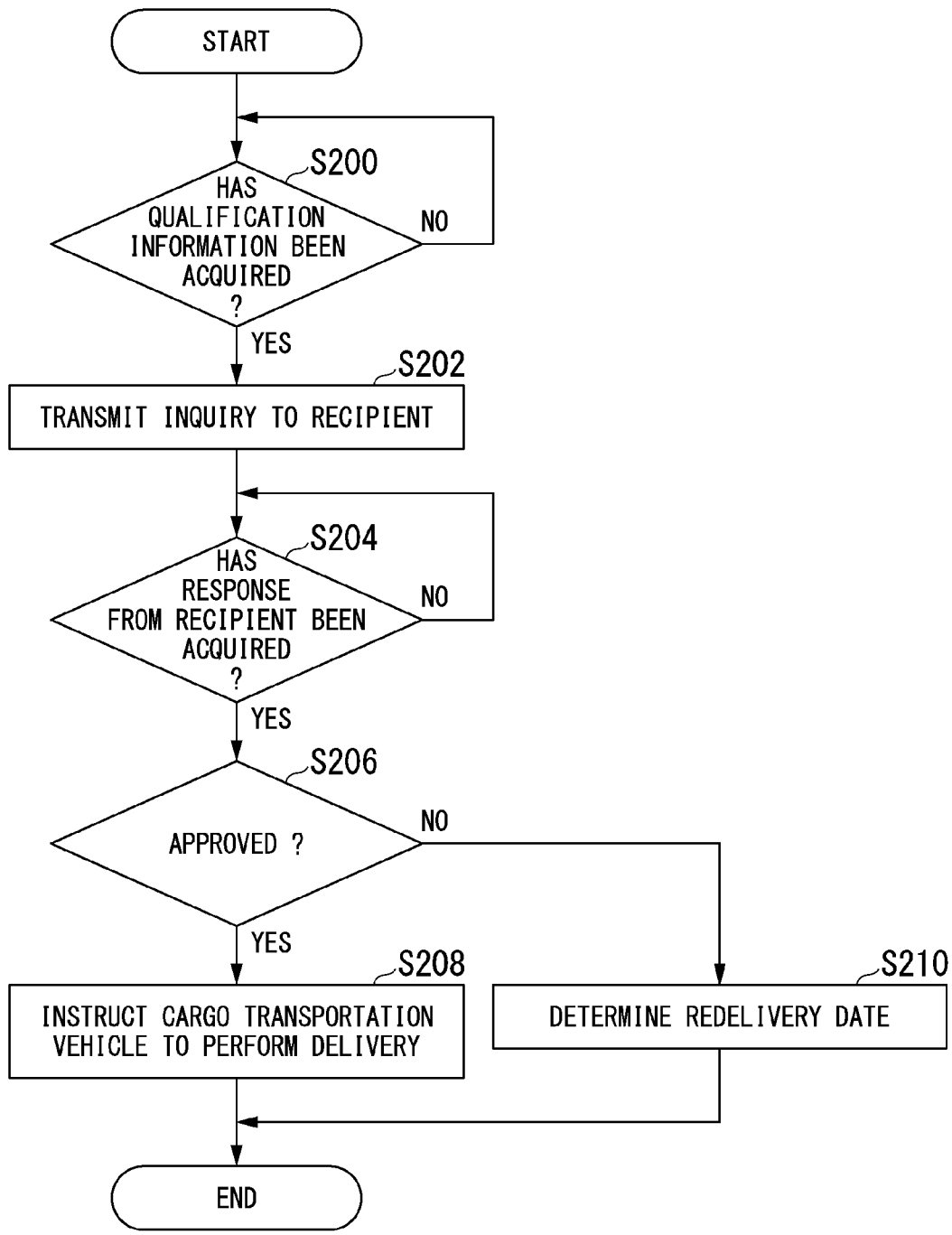
FIG. 12 is a flowchart showing an example of a flow of a process executed by the management device.

FIG. 12 is a flowchart showing an example of a flow of a process executed by the management device 300. For example, the present process is a process executed after the management device 300 acquires request information. First, the receiver 320 of the management device 300 determines whether or not the qualification information has been received (step S200). The qualification information is information for setting a qualified recipient who is authorized to receive the cargo among the recipients included in the group. A predetermined recipient (a preset recipient or a representative recipient) operates the terminal device 100 to transmit the qualification information to the management device 300.

When the qualification information has been received, the management device 300 notifies the recipient who has transmitted the qualification information that the qualification information has been received and asks about whether or not it is OK to confirm that the qualification information be reflected in a subsequent process (step S202). That is, when the qualification information has been received, the management device 300 transmits an inquiry of whether or not approval for the receipt is possible to the terminal device 100 associated with the qualified recipient in the qualification information. Next, the management device 300 acquires a response to the inquiry (step S204).

The management device 300 determines whether or not the response is a response indicating the approval (step S206). When the response is a response indicating the approval (for example, when the response is a response indicating a situation of proxy receipt), the management device 300 instructs the cargo transportation vehicle 200 to travel toward the designated delivery point (step S208). When the response is a response indicating disapproval (for example, when the response is not a response indicating a situation of proxy receipt), the management device 300 determines a redelivery date by instructing the cargo transportation vehicle 200 to skip the delivery of the cargo so that the cargo is not delivered at this time and the cargo is delivered at a different timing (step S210). Thereby, the process of the present flowchart ends. In the above-described process, when a qualified recipient of the cargo is set, a newly set password or the like is transmitted to a terminal device 100 of the qualified recipient and a pre-transmitted passcode may be invalidated.

Figure 13:
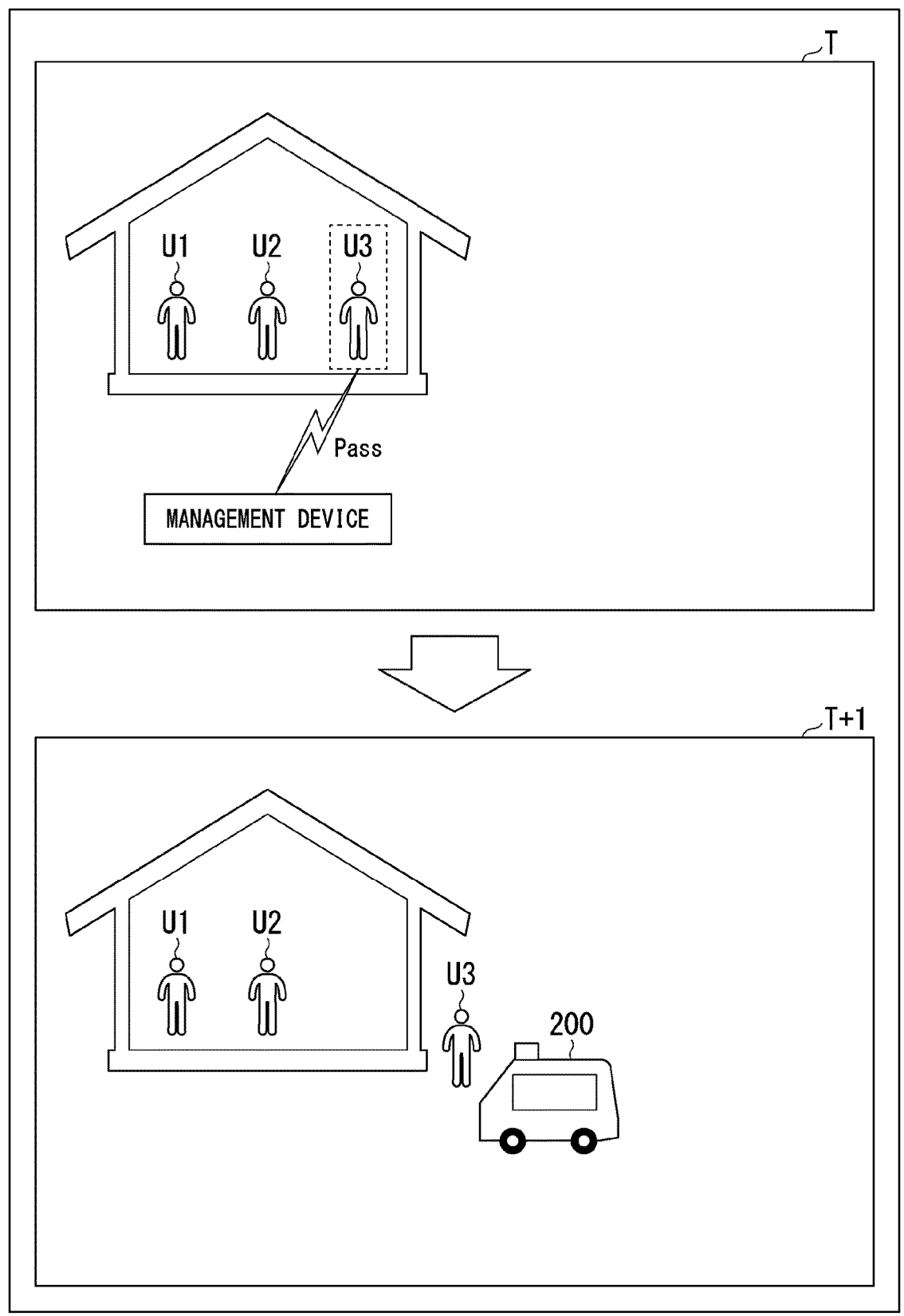
FIG. 13 is a diagram for describing a process (part 2) when cargo is delivered.

FIG. 13 is a diagram for describing a process (part 2) when cargo is delivered. It is assumed that the recipient U3 has transmitted qualification information in which a recipient is limited to only himself or herself to the management device 300 at time T after the delivery of the cargo is requested. It is assumed that the management device 300 limits the qualified recipient to the recipient U3 and the confirmation of the recipient U3 is obtained. At time T+1 shortly before the cargo transportation vehicle 200 arrives at the delivery point, the management device 300 notifies the terminal device 100 of the recipient U3 that the cargo will arrives. When the cargo transportation vehicle 200 arrives at the delivery point, the recipient U3 can take out the cargo from the storage 240 of the cargo transportation vehicle 200.

As described above, the recipient U3 may want to receive the cargo by himself or herself in a state in which the cargo is not known to other recipients. In this case, the recipient U3 can receive the cargo in a state in which the cargo is not known to other recipients by limiting the qualified recipient to himself or herself or a predetermined recipient. As a result, the convenience of the user is improved.

[Process of Changing Receipt Place]

The management device 300 receives a change request for changing a delivery point from a terminal device in accordance with an operation of a predetermined user, and determines an operation of the cargo transportation vehicle 200 so that the cargo transportation vehicle 200 arrives at the delivery point based on the change request received by the receiver.

Figure 14:
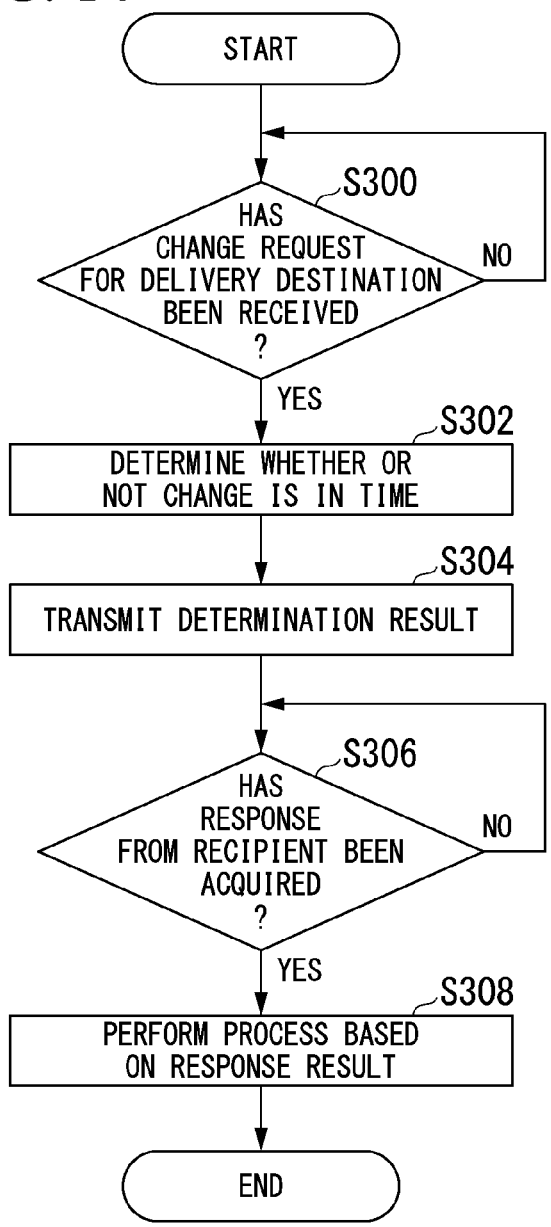
FIG. 14 is a flowchart showing an example of a flow of a process executed by the management device.

FIG. 14 is a flowchart showing an example of a flow of a process executed by the management device 300. The present process is, for example, a process executed after the management device 300 acquires request information. First, the receiver 320 of the management device 300 determines whether or not a request for changing a delivery point has been received (step S300). The delivery point change request is information that a predetermined recipient included in the group requests a change in the place where the cargo is received. A predetermined recipient (a preset recipient or a representative recipient) operates the terminal device 100 to transmit the change request to the management device 300.

When the change request has been received, the management device 300 determines whether or not the change of the delivery point is in time (step S302), and returns a response of a determination result to the terminal device 100 that has transmitted the change request (step S304). For example, when the cargo transportation vehicle is near the delivery point, when the change in the delivery point makes it difficult to carry out a movement schedule, or when delivery cannot be done efficiently, it is determined that the change in the delivery point is not in time.

Next, the management device 300 waits until a response to the transmission of the determination result is acquired from the terminal device 100. When the response has been acquired (step S306), the management device 300 performs a process based on the acquired response (step S308). A response-based process is the following process. The response-based process is a process in which the management device 300 causes the cargo transportation vehicle 200 to travel toward the changed delivery point when the delivery point can be changed and the recipient has approved the change. The response-based process is a process in which the management device 300 causes the cargo transportation vehicle 200 to travel toward the set delivery point when the delivery point cannot be changed and the recipient has cancelled the change in the delivery point. The response-based process is a process in which the management device 300 causes the cargo transportation vehicle 200 to travel toward another point if the change to the other point is possible when the delivery point can be changed and the recipient makes a request to change the delivery point to another point. Thereby, the process of the present flowchart ends.

Figure 15:
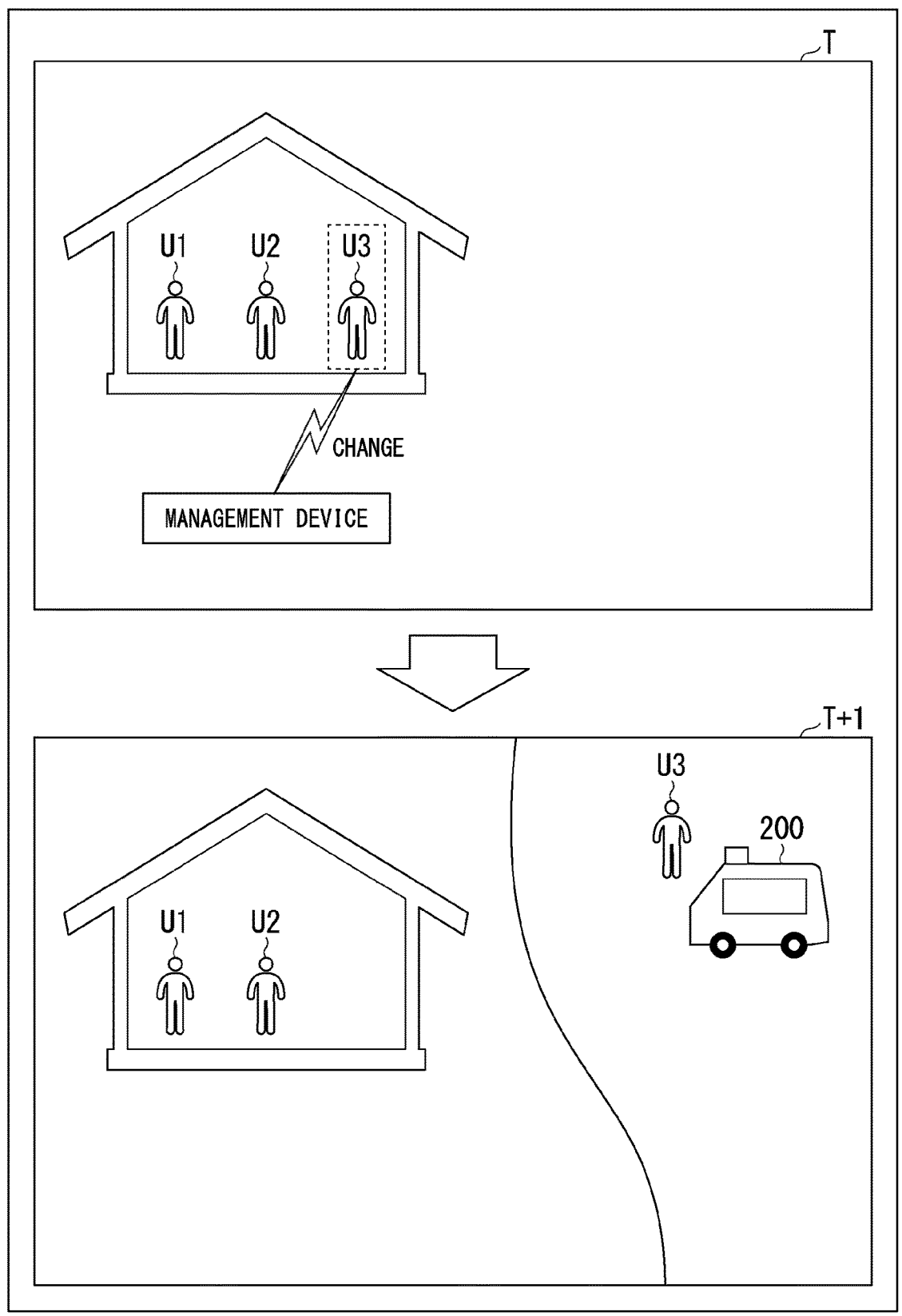
FIG. 15 is a diagram for describing a process (part 3) when cargo is delivered.

FIG. 15 is a diagram for describing a process (part 3) when the cargo is delivered. It is assumed that the recipient U3 has transmitted a change request for changing the delivery point to the management device 300 at time T after the delivery of the cargo was requested. When it is determined that the delivery point can be changed and the approval for the recipient who has transmitted the change request has been obtained, the management device 300 causes the cargo transportation vehicle 200 to travel toward the changed delivery point. At time T+1 shortly before the cargo transportation vehicle 200 arrives at the delivery point, the management device 300 notifies the terminal device 100 of the recipient U3 that the cargo will arrive. The notification in this case is provided only to, for example, the recipient who has made the change request. When the cargo transportation vehicle 200 arrives at the delivery point, the recipient U3 can take out the cargo from the storage 240 of the cargo transportation vehicle 200.

As described above, the recipient U3 may want to receive the cargo by himself or herself in a state in which the cargo is not known to other recipients. In this case, the recipient U3 can change the delivery point and receive the cargo in a state in which the cargo is not known to other recipients. As a result, the convenience of the user is improved.

[Process of Providing Delivery Completion Notification]

When designation information in which the provision of information about the transportation of the cargo to a terminal device 100 of a designated user among a plurality of users is designated has been received, the management device 300 provides information about the transportation of the cargo to the terminal device 100 of the user designated on the basis of the designation information. The designation information may be information set by the user (or a predetermined user) who has provided the qualification information or the change request or may be automatically set in accordance with the above-described qualification information or change request. For example, when the qualification information or the change request has been provided, the information about the transportation of the cargo is provided only to the terminal device 100 of the user who has transmitted the qualification information or the change request. The information about the transportation of the cargo includes a part or all of various types of information such as position information of the cargo, information indicating that the cargo has been delivered, and a type of cargo.

Figure 16:
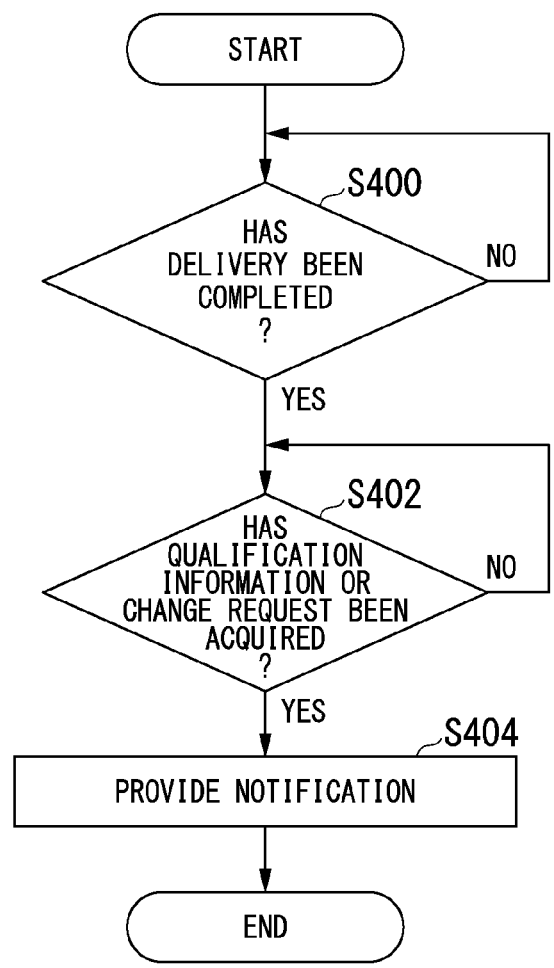
FIG. 16 is a flowchart showing an example of a flow of a process executed by the management device.

FIG. 16 is a flowchart showing an example of a flow of a process executed by the management device 300. First, the management device 300 determines whether or not the delivery of cargo has been completed (step S400). When the delivery of cargo has been completed, the management device 300 determines whether or not the qualification information or the change request has been acquired between the time when the request information is received and the time when the delivery is completed (step S402). When the qualification information or the change request has been acquired, the management device 300 notifies a predetermined recipient among recipients included in a group of the completion of delivery on the basis of an acquisition result of step S402 (step S404). For example, the management device 300 provides a completion notification indicating that the delivery has been completed to a terminal device 100 of a qualified recipient set by the qualification information or a recipient who has transmitted a change request. For example, when a qualified recipient is set and the delivery point is changed by the change request, the management device 300 transmits a completion notification to the recipient who has provided the notification of the change request and the qualified recipient.

Figure 17:
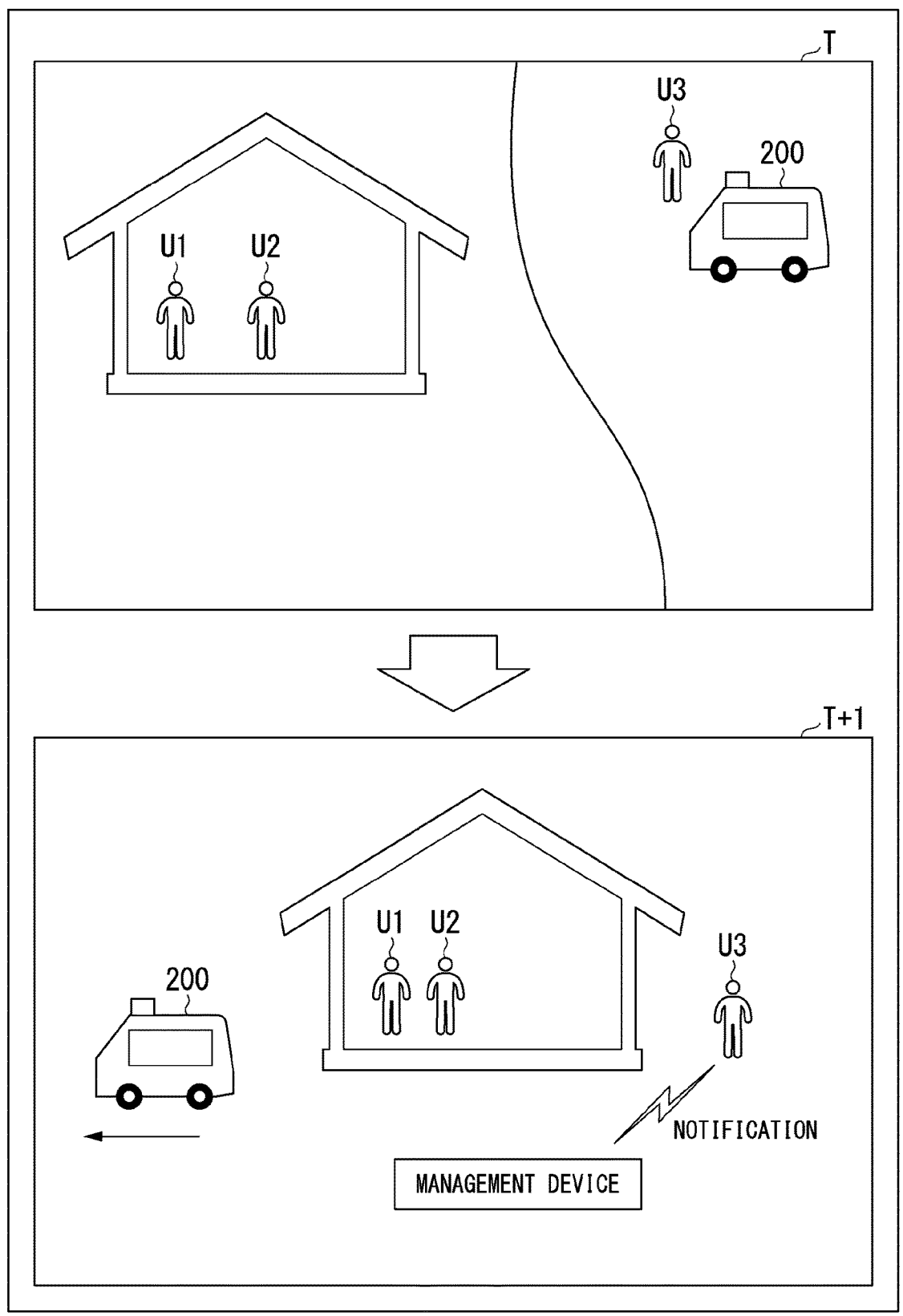
FIG. 17 is a diagram for describing a process (part 4) when cargo is delivered.

FIG. 17 is a diagram for describing a process (part 4) when the cargo is delivered. It is assumed that the recipient U3 has transmitted a change request for changing a delivery point to the management device 300 after the delivery of the cargo was requested. When the cargo transportation vehicle 200 arrives at the delivery point at time T, the recipient U3 can take out the cargo from the storage 240 of the cargo transportation vehicle 200. At time T+1 after the cargo is taken out from the cargo transportation vehicle 200, the management device 300 notifies the terminal device 100 of the recipient U3 who has transmitted the change request that the delivery of the cargo has been completed.

As described above, the recipient U3 can receive the cargo in a state in which the cargo is not known to other recipients. As a result, the convenience of the user is improved.

Although a case in which communication is performed via a network such as the Internet with respect to information for use in authentication when the cargo is taken out has been described in the above-described example, the management device 300 may provide recipient information (for example, a passcode) indicating a recipient capable of unloading cargo from the storage 240 to the terminal device 100 which cannot connect to the above-described network or in which an application program of a transportation service is not installed via a voice transmission and reception network (a telephone communication network) different from the above-described network.

The management device 300 may provide the recipient information indicating a recipient capable of unloading cargo from the storage 240 to a terminal device 100 of each of a plurality of users or a predetermined terminal device 100 using an automated telephone service.

According to the above-described embodiment, the convenience of the user is improved by performing a process of controlling the control mechanism of the storage 240 so that the recipient can unload the cargo from the storage 240 when the management device 300 has successfully performed the authentication process on the recipient registered by the registrant 332 that registers a plurality of users as the recipients of the cargo.

Second Embodiment

A second embodiment will be described below. In the first embodiment, a recipient is a user included in a pre-registered group. On the other hand, in the second embodiment, a group of users who will be recipients is set afterward. Hereinafter, differences from the first embodiment will be mainly described.

Figure 18:
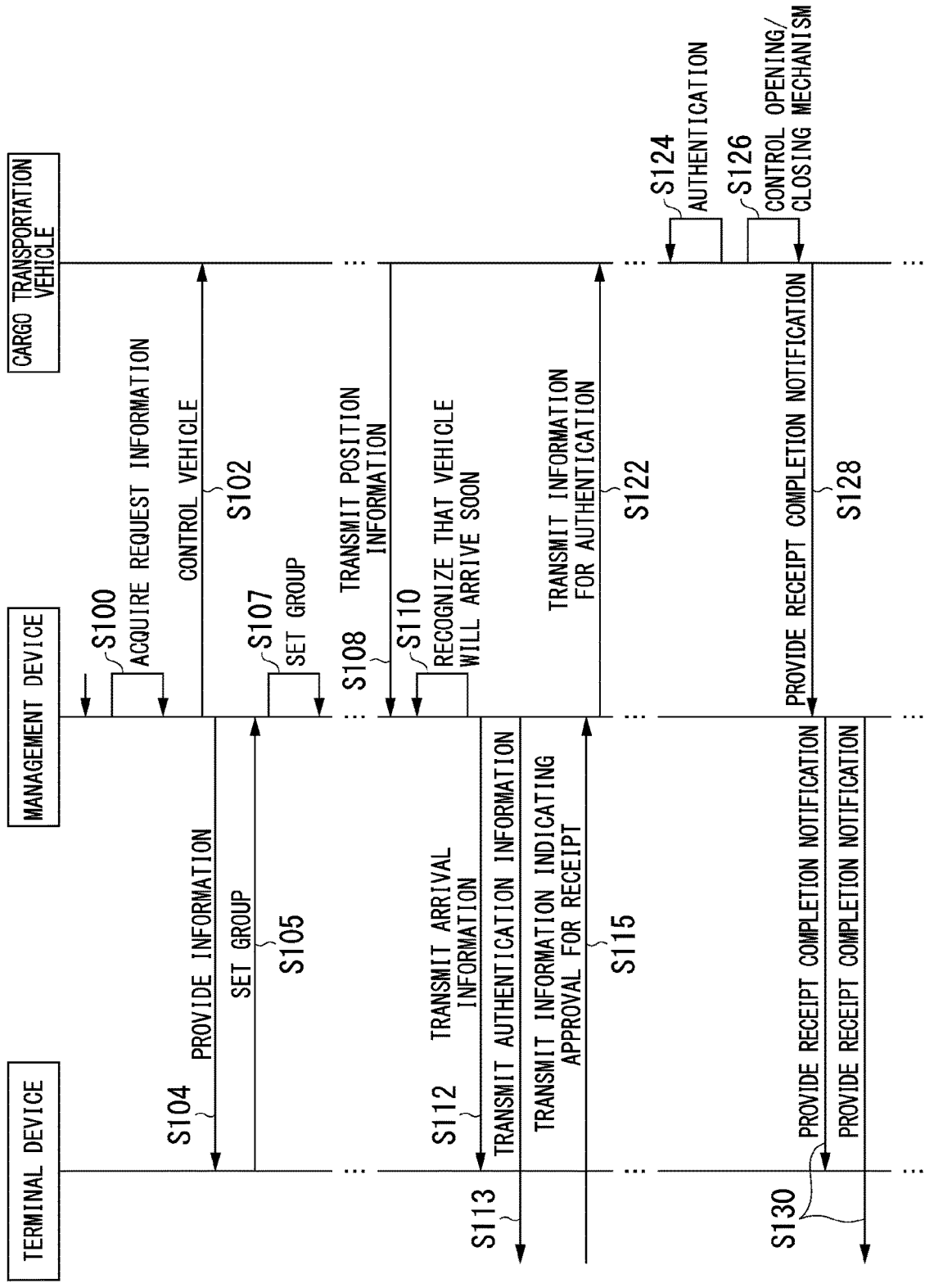
FIG. 18 is a sequence diagram showing an example of a flow of a process executed by a terminal device, a cargo transportation vehicle, and a management device according to a second embodiment.

FIG. 18 is a sequence diagram showing an example of a flow of a process executed by a terminal device 100, a cargo transportation vehicle 200, and a management device 300 according to the second embodiment. In the present process, a user included in a group is not pre-defined as the recipient. After the processing of steps S100, S102, and S104, the terminal device 100 of a predetermined user designates users, sets a group, and transmits information of the set group to the management device 300 (step S105). The management device 300 sets a user included in the group as a recipient on the basis of the information transmitted by the terminal device 100 (step S107).

Next, the management device 300 acquires position information transmitted by the cargo transportation vehicle 200 (step S108) and recognizes a position of the cargo transportation vehicle 200 on the basis of the acquired position information (step S110). When it is recognized that the cargo transportation vehicle 200 has arrived near the delivery point (it is recognized that it is several minutes to several tens of minutes before the cargo transportation vehicle 200 arrives at the delivery point) (step S110), the management device 300 notifies the terminal device 100 of the recipient included in the group of information indicating that the cargo transportation vehicle 200 will arrive soon and authentication information (steps S112 and S113).

The terminal device 100 of the predetermined recipient transmits information indicating approval for the receipt (or information indicating disapproval for the receipt) to the management device 300 (step S115). Next, the management device 300 transmits information for authentication (for example, a passcode) to the cargo transportation vehicle 200 (step S122). The processing of steps S124, S126, S128, and S130 is performed.

According to the above-described second embodiment, the user can set a user who will be the recipient afterward, so that the convenience of the user is improved.

Third Embodiment

Hereinafter, a third embodiment will be described. In the first embodiment, a recipient is a user included in a pre-registered group. On the other hand, in the third embodiment, another user is designated as the recipient on the basis of an instruction of a pre-designated recipient. Hereinafter, differences from the first embodiment will be mainly described.

Figure 19:
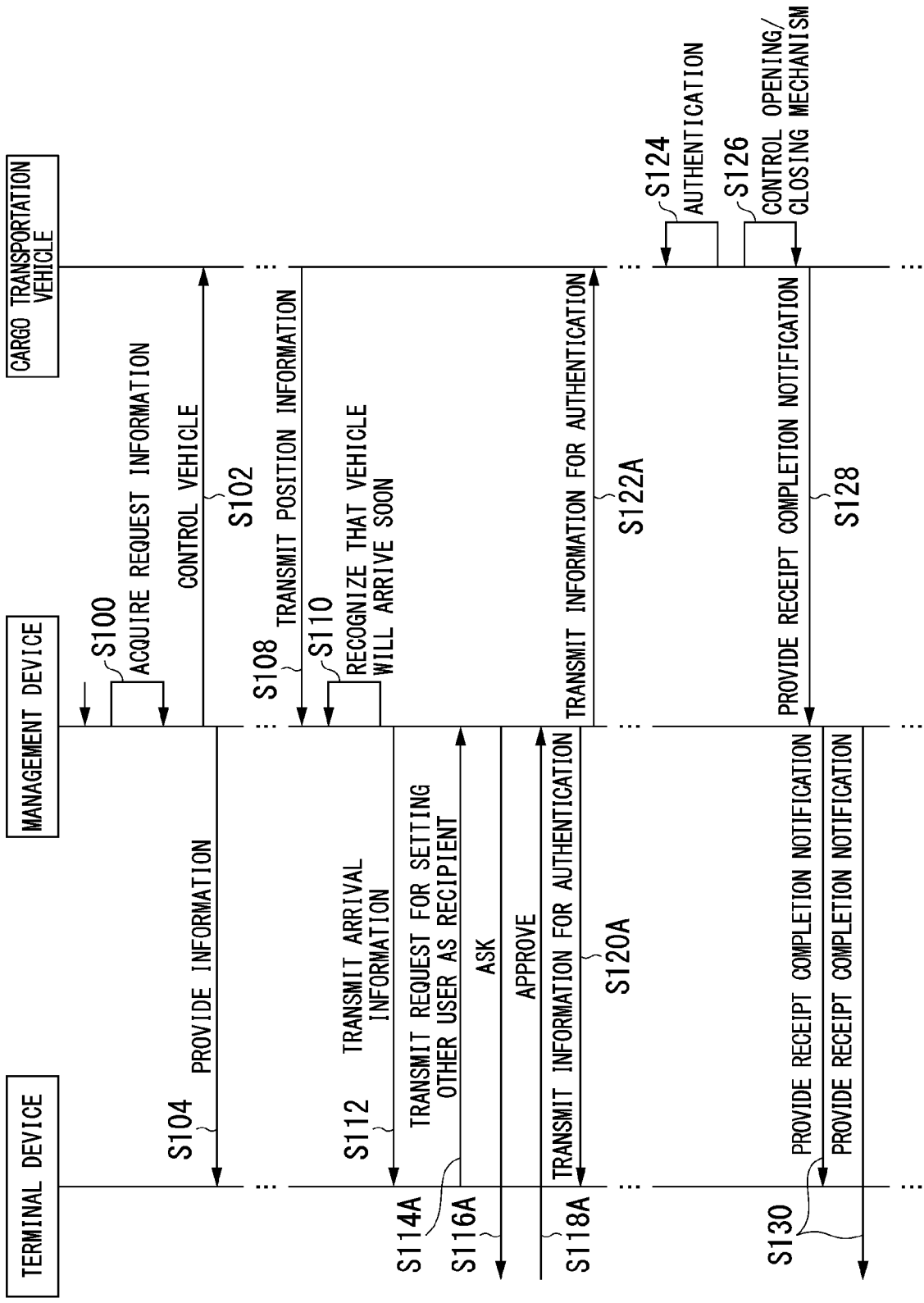
FIG. 19 is a sequence diagram showing an example of a flow of a process executed by a terminal device, a cargo transportation vehicle, and a management device according to a third second embodiment.

FIG. 19 is a sequence diagram showing an example of a flow of a process executed by a terminal device 100, a cargo transportation vehicle 200, and a management device 300 according to the third embodiment. In the present process, a user included in a group is not pre-defined as the recipient. After the processing of steps S100, S102, and S104, the processing of step S108 is performed. The processing of step S106 is omitted. That is, a cargo movement schedule and information used for authentication are transmitted to a predetermined user (for example, one user).

Next, the management device 300 acquires position information transmitted by the cargo transportation vehicle 200 (step S108) and recognizes a position of the cargo transportation vehicle 200 on the basis of the acquired position information (step S110).

Figure 20:
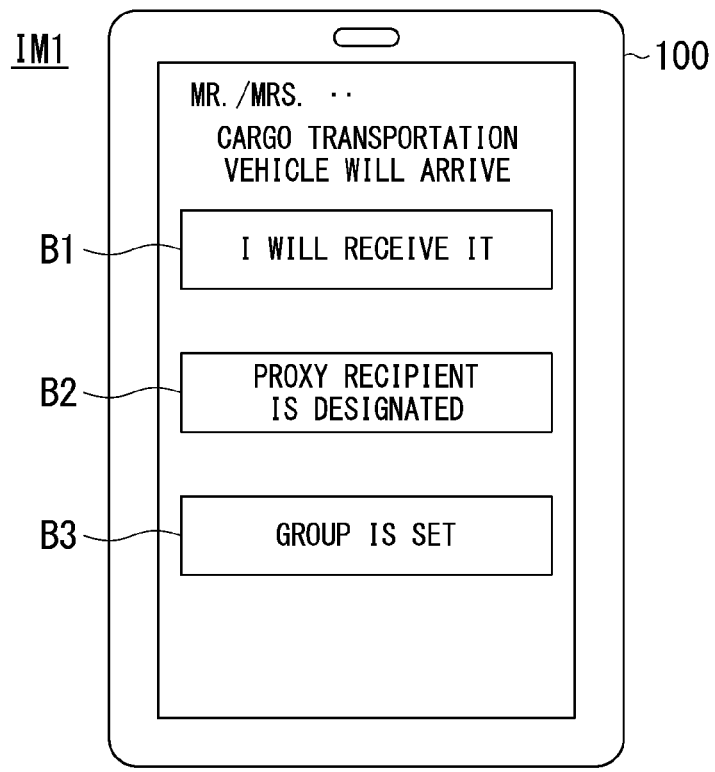
FIG. 20 is a diagram showing an example of an image displayed on the terminal device.

Next, the management device 300 notifies the terminal device 100 of a predetermined recipient that the cargo transportation vehicle 200 will arrive soon when the cargo transportation vehicle 200 arrives near the delivery point (several minutes to several tens of minutes before the cargo transportation vehicle 200 arrives at the delivery point) (step S112). FIG. 20 is a diagram showing an example of an image IM1 displayed on the terminal device 100. As shown in FIG. 20, the image IM1 includes a button B1 indicating one's own intention to receive the cargo, a button B2 for designating a proxy recipient, and a button B3 for designating a group.

Figure 21:
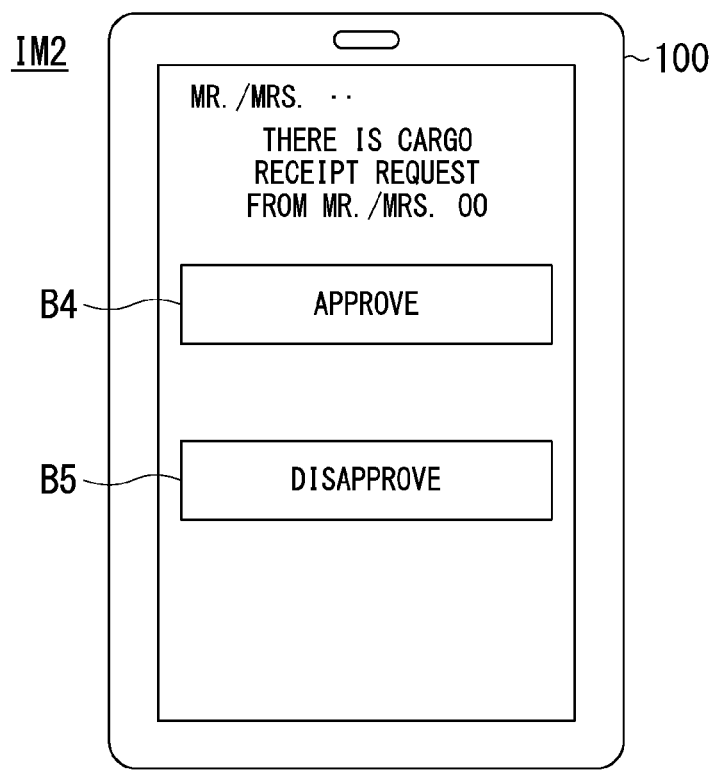
FIG. 21 is a diagram showing an example of an image displayed on a display of a terminal device of another user.

When a terminal device 100 of a predetermined recipient requests the management device 300 to set another user as the recipient (step S114A), the management device 300 asks the other user about approval for the recipient (step S116A). FIG. 21 is a diagram showing an example of an image IM2 displayed on a display of a terminal device 100 of the other user. The image IM2 includes information about an inquiry of whether or not the user has approved that he or she can become the recipient, a button B4 for transmitting information indicating that the user can become the recipient, and a button B5 for transmitting information indicating that the user has disapproved that he or she can become the recipient.

When information indicating approval for the inquiry is transmitted from the terminal device 100 of the other user to the management device (step S118A), the management device 300 transmits information for authentication to the terminal device 100 of the other user and the cargo transportation vehicle 200 (steps S120A and S122A). The processing of steps S124, S126, S128, and S130 is performed.

According to the above-described third embodiment, the management device 300 has effects similar to those of the first embodiment by designating another user as a recipient on the basis of an instruction of the recipient.

Some of the functions included in the management device 300 may be provided in the cargo transportation vehicle 200. For example, some or all of the receiver 320, the registrant 332, the operation determiner 340, the information provider 350, and the payment processor 360 and some or all of the functions of these functional units may be provided in the cargo transportation vehicle 200. Also, a part or all of the information stored in the storage 390 of the management device 300 may be stored in the storage 280 of the cargo transportation vehicle 200.

The above-described embodiment can be implemented as follows.

A management device for managing an operation of a cargo transportation vehicle that autonomously travels on a road in a state in which there is no driver in the cargo transportation vehicle and that is able to store cargo in each of a plurality of storages shielded by doors that are opened and closed, the management device including:

a storage device storing a program; and a hardware processor, wherein the hardware processor executes the program stored in the storage device to:

receive request information about transportation of the cargo from a user;

determine the operation of the cargo transportation vehicle so that the cargo transportation vehicle arrives at a delivery destination of the cargo;

register a plurality of users pre-designated as recipients of the cargo; and performing a process of controlling a control mechanism of the storage so that the recipient is able to unload the cargo from the storage when an authentication process on the registered recipient has succeeded.

Although modes for carrying out the present invention have been described above using the embodiments, the present invention is not limited to the embodiments and various modifications and replacements can be applied without departing from the spirit and scope of the present invention.

What is claimed is:

1. A management device for managing an operation of a cargo transportation vehicle that autonomously travels on a road in a state in which there is no driver in the cargo transportation vehicle and that is able to store cargo in each of a plurality of storages shielded by doors that are opened and closed, the management device comprising:

at least one memory storing instructions, and at least one processor configured to execute the instructions to:

receive request information about transportation of the cargo from a user;

determine the operation of the cargo transportation vehicle so that the cargo transportation vehicle arrives at a delivery destination of the cargo;

register a plurality of users pre-designated as recipients of the cargo; and perform a process of controlling a control mechanism of the storage so that the recipient is able to unload the cargo from the storage when an authentication process on the recipient registered by the registrant has succeeded, the control mechanism of the storage opens a door of the storage according with the process of controlling the control mechanism, at least one processor is further configured to execute instructions to:

provide a notification requesting a receiving of the cargo with a terminal device of a second user included the plurality of users, when the management device acquires information indicating that a first user included the plurality of users has not approved receiving the cargo from a terminal device of the first user after the cargo transportation vehicle travels toward the delivery destination for delivering the cargo to the first user and before the cargo transportation vehicle arrives the delivery destination, provide an information for authentication of the second user with the cargo transportation vehicle when the management device acquires information indicating that the second user has approved to receive the cargo, the control mechanism of the storage opens the door of the storage according with the process of controlling the control mechanism when the second user performs the process for opening the door of the storage using the information for authentication of the second user.

2. The management device according to claim 1,
wherein the request information includes information of a group for receiving the cargo, and
wherein the registrant registers each of a plurality of preset recipients included in the group as the recipients of the cargo.

3. The management device according to claim 1, wherein the at least one processor is configured to provide recipient information indicating a recipient capable of unloading the cargo from the storage to a terminal device of each of the plurality of users.

4. The management device according to claim 1, wherein the authentication process is a process in which an authenticator provided in the cargo transportation vehicle authenticates the recipient and is a process in which the authenticator authenticates the recipient based on an input password, information transmitted through short-range wireless communication, or an image captured by a camera.

5. The management device according to claim 1, wherein the at least one processor is configured to provide information about unloading of the cargo to a terminal device associated with each of the plurality of users when the cargo has been unloaded from the storage based on an authentication process on a predetermined recipient among the plurality of users.

6. The management device according to claim 1, wherein the at least one processor is configured to:
receive qualification information indicating that a qualified recipient is set from a terminal device or the request information including the qualification information in accordance with an operation of a predetermined user included in the plurality of users, and
wherein the registrant sets the recipient who is qualified to be registered based on the qualification information.

7. The management device according to claim 6, wherein the at least one processor is configured to: transmit an inquiry of whether or not approval for receipt is possible to the terminal device associated with the qualified recipient set in the qualification information in response to receiving the qualification information, and determine the operation of the cargo transportation vehicle so that the cargo transportation vehicle arrives at the delivery destination of the cargo in response to receiving information indicating the approval for the receipt according to the inquiry.

8. The management device according to claim 6, wherein the at least one processor is configured to:
receive a change request for changing the delivery destination from a terminal device in accordance with an operation of the predetermined user, and
determine the operation of the cargo transportation vehicle so that the cargo transportation vehicle arrives at the delivery destination based on the change request.

9. The management device according to claim 1, wherein the at least one processor is configured to: provide information about the transportation of the cargo to terminal devices associated with the plurality of users,
receive designation information for designating that the information about the transportation of the cargo is provided to a terminal device of a designated user among the plurality of users, and
provide the information about the transportation of the cargo to the terminal device of the designated user based on the designation information in response to having received the designation information.

10. The management device according to claim 1, wherein the at least one processor is configured to: provide recipient information indicating a recipient capable of unloading the cargo from the storage to a terminal device included in the plurality of users which is unable to be connected to a predetermined network or in which a predetermined application program is not installed via a voice transmission and reception network different from the predetermined network.

11. The management device according to claim 1, wherein the at least one processor is configured to: provide recipient information indicating a recipient capable of unloading the cargo from the storage to a terminal device included in the plurality of users using an automated telephone service.

12. A management device for managing an operation of a cargo transportation vehicle that autonomously travels on a road in a state in which there is no driver in the cargo transportation vehicle and that is able to store cargo in each of a plurality of storages shielded by doors that are opened and closed, the management device comprising:
at least one memory storing instructions, and
at least one processor configured to execute the instructions to:
receive request information about transportation of the cargo from a user;
determine the operation of the cargo transportation vehicle so that the cargo transportation vehicle arrives at a delivery destination of the cargo;
provide authority information indicating authority to unload the cargo from the storage to a first terminal device of a first recipient of the cargo that has been pre-designated and provide the authority information to a second terminal device when a request for providing the authority information to the second terminal device of a second recipient of a group to which the first recipient belongs has been received from the first terminal device according to an operation of the first recipient; and
perform a process of controlling a control mechanism of the storage so that the cargo is able to be unloaded from the storage based on the authority information, the control mechanism of the storage opens a door of the storage according with the process of controlling the control mechanism, at least one processor is further configured to execute instructions to:

provide a notification requesting a receiving of the cargo with a terminal device of a second user included the plurality of users, when the management device acquires information indicating that a first user included the plurality of users has not approved receiving the cargo from a terminal device of the first user after the cargo transportation vehicle travels toward the delivery destination for delivering the cargo to the first user and before the cargo transportation vehicle arrives the delivery destination, provide an information for authentication of the second user with the cargo transportation vehicle when the management device acquires information indicating that the second user has approved to receive the cargo, the control mechanism of the storage opens the door of the storage according with the process of controlling the control mechanism when the second user performs the process for opening the door of the storage using the information for authentication of the second user.

13. A transportation system for managing an operation of a cargo transportation vehicle that autonomously travels on a road in a state in which there is no driver in the cargo transportation vehicle and that is able to store cargo in each of a plurality of storages shielded by doors that are opened and closed, the transportation system comprising:

at least one memory storing instructions, and at least one processor configured to execute the instructions to:

receive request information about transportation of the cargo from a user;

determine the operation of the cargo transportation vehicle so that the cargo transportation vehicle arrives at a delivery destination of the cargo;

register a plurality of users pre-designated as recipients of the cargo; and control a control mechanism of the storage so that the recipient is able to unload the cargo from the storage when an authentication process on the recipient registered by the registrant has succeeded, the control mechanism of the storage opens a door of the storage according with the process of controlling the control mechanism, at least one processor is further configured to execute instructions to:

provide a notification requesting a receiving of the cargo with a terminal device of a second user included the plurality of users, when the management device acquires information indicating that a first user included the plurality of users has not approved receiving the cargo from a terminal device of the first user after the cargo transportation vehicle travels toward the delivery destination for delivering the cargo to the first user and before the cargo transportation vehicle arrives the delivery destination, provide an information for authentication of the second user with the cargo transportation vehicle when the management device acquires information indicating that the second user has approved to receive the cargo, the control mechanism of the storage opens the door of the storage according with the process of controlling the control mechanism when the second user performs the process for opening the door of the storage using the information for authentication of the second user.

14. A management method comprising:

receiving, by a management device, request information about transportation of the cargo from a user, the management device managing an operation of a cargo transportation vehicle that autonomously travels on a road in a state in which there is no driver in the cargo transportation vehicle and that is able to store cargo in each of a plurality of storages shielded by doors that are opened and closed;

determining, by the management device, an operation of the cargo transportation vehicle so that the cargo transportation vehicle arrives at a delivery destination of the cargo;

registering, by the management device, a plurality of users pre-designated as recipients of the cargo; and performing, by the management device, a process of controlling a control mechanism of the storage so that the recipient is able to unload the cargo from the storage when an authentication process on the registered recipient has succeeded, wherein the control mechanism of the storage opens a door of the storage according with the process of controlling the control mechanism, providing a notification requesting a receiving of the cargo with a terminal device of a second user included the plurality of users, when the management device acquires information indicating that a first user included the plurality of users has not approved receiving the cargo from a terminal device of the first user after the cargo transportation vehicle travels toward the delivery destination for delivering the cargo to the first user and before the cargo transportation vehicle arrives the delivery destination, providing an information for authentication of the second user with the cargo transportation vehicle when the management device acquires information indicating that the second user has approved to receive the cargo, wherein the control mechanism of the storage opens the door of the storage according with the process of controlling the control mechanism when the second user performs the process for opening the door of the storage using the information for authentication of the second user.

15. A management system comprising the management device according to claim 1 and the storage, wherein control mechanism of the storage acquires the information for authentication of the second user from the management system, wherein control mechanism of the storage opens the door of the storage according with the process for opening the door when the second user perform the process for opening the door of the storage using the information for authentication of the second user.

* * * * *